INVENTORS
HARRY L. BERKEY
ARTHUR H. BILLOW
WILBUR R. BECKNER, JR.
BY
ATTORNEYS

INVENTORS
HARRY L. BERKEY
ARTHUR H. BILLOW
WILBUR R. BECKNER, JR.
ATTORNEYS

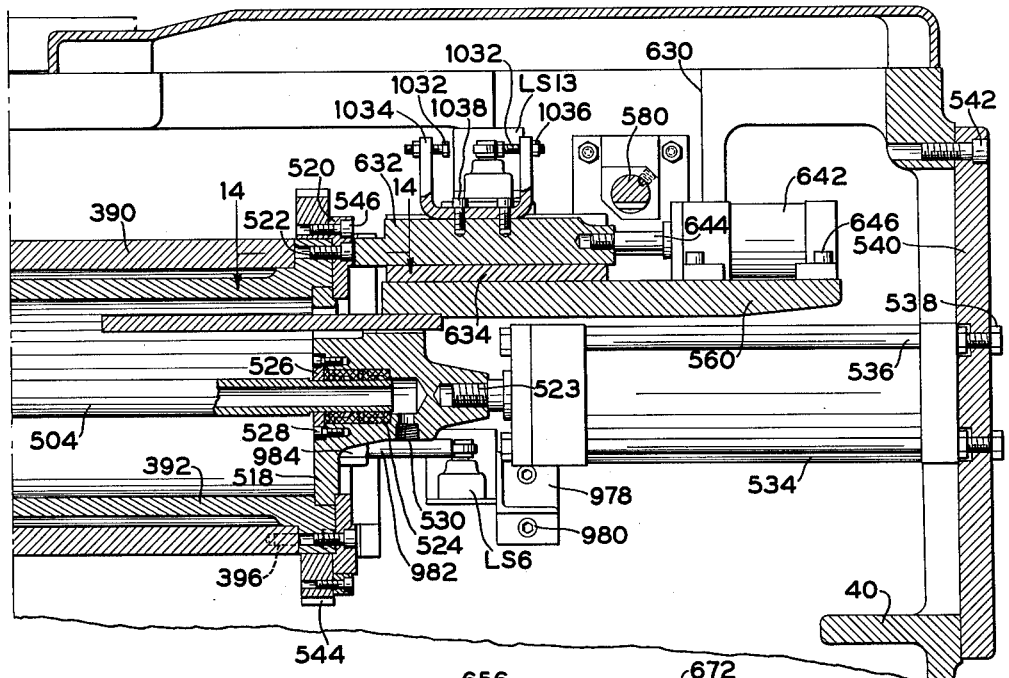
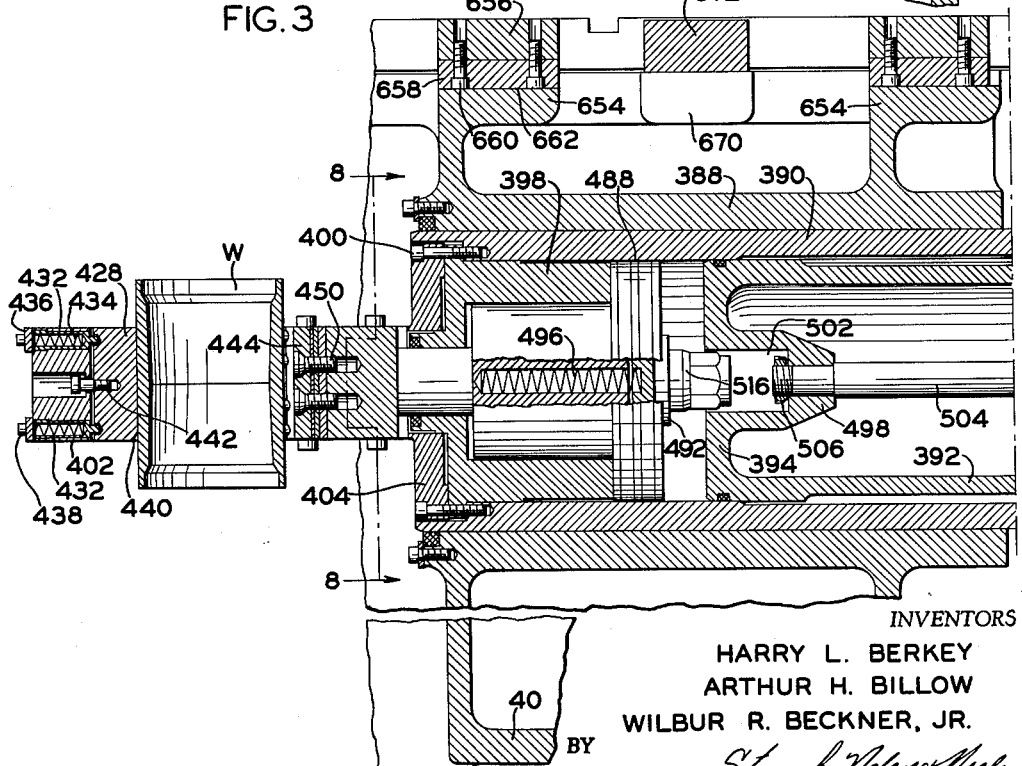
FIG. 3
INVENTORS
HARRY L. BERKEY
ARTHUR H. BILLOW
WILBUR R. BECKNER, JR.
ATTORNEYS Oct. 30, 1962  H. L. BERKEY ETAL  3,060,467
PIPE COUPLING TAPPING MACHINE WITH INDEXABLE WORK CHUCK
Filed June 17, 1957  17 Sheets-Sheet 4

INVENTORS
HARRY L. BERKEY
ARTHUR H. BILLOW
WILBUR R. BECKNER, JR.
BY
*Strauch, Nolan & Neale*
ATTORNEYS

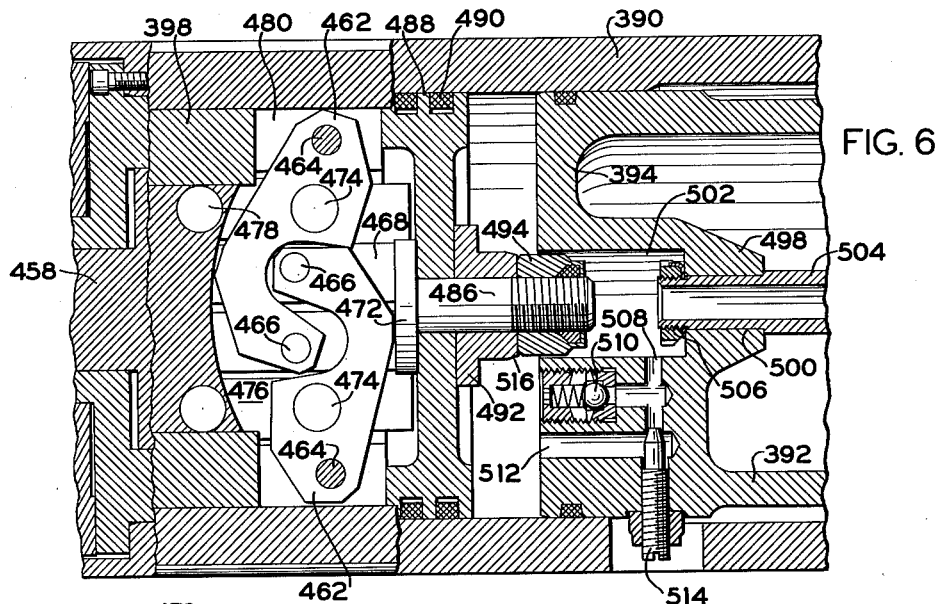
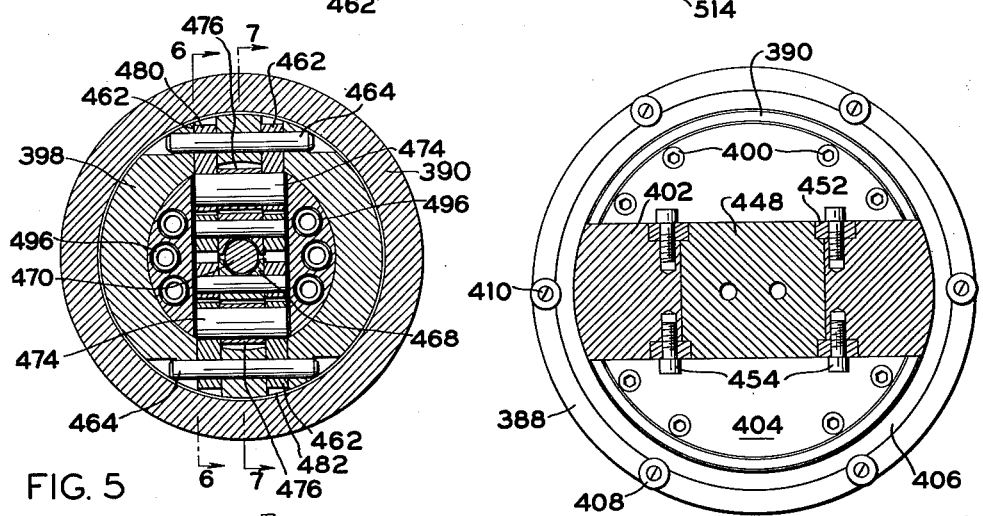
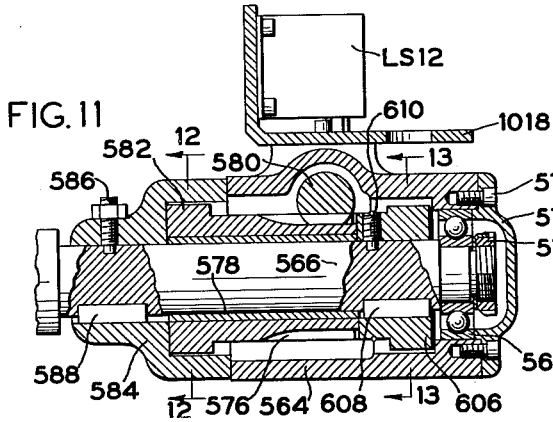

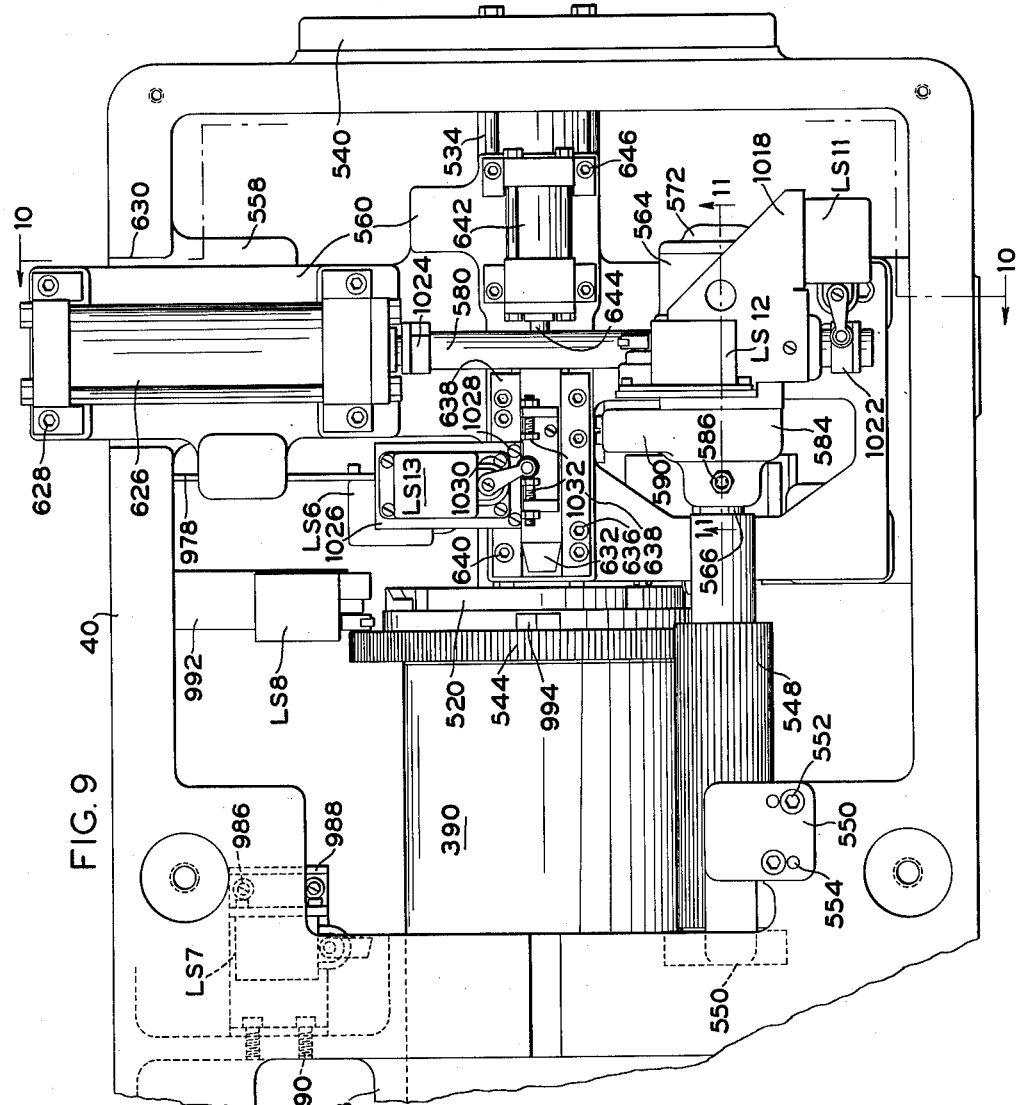
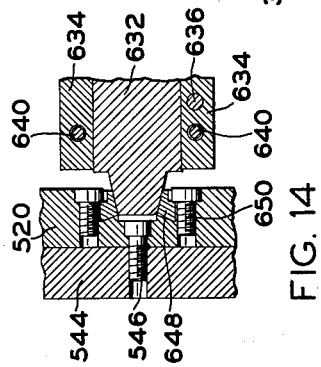
FIG. 9
FIG. 14
INVENTORS
HARRY L. BERKEY
ARTHUR H. BILLOW
WILBUR R. BECKNER, JR.
ATTORNEYS

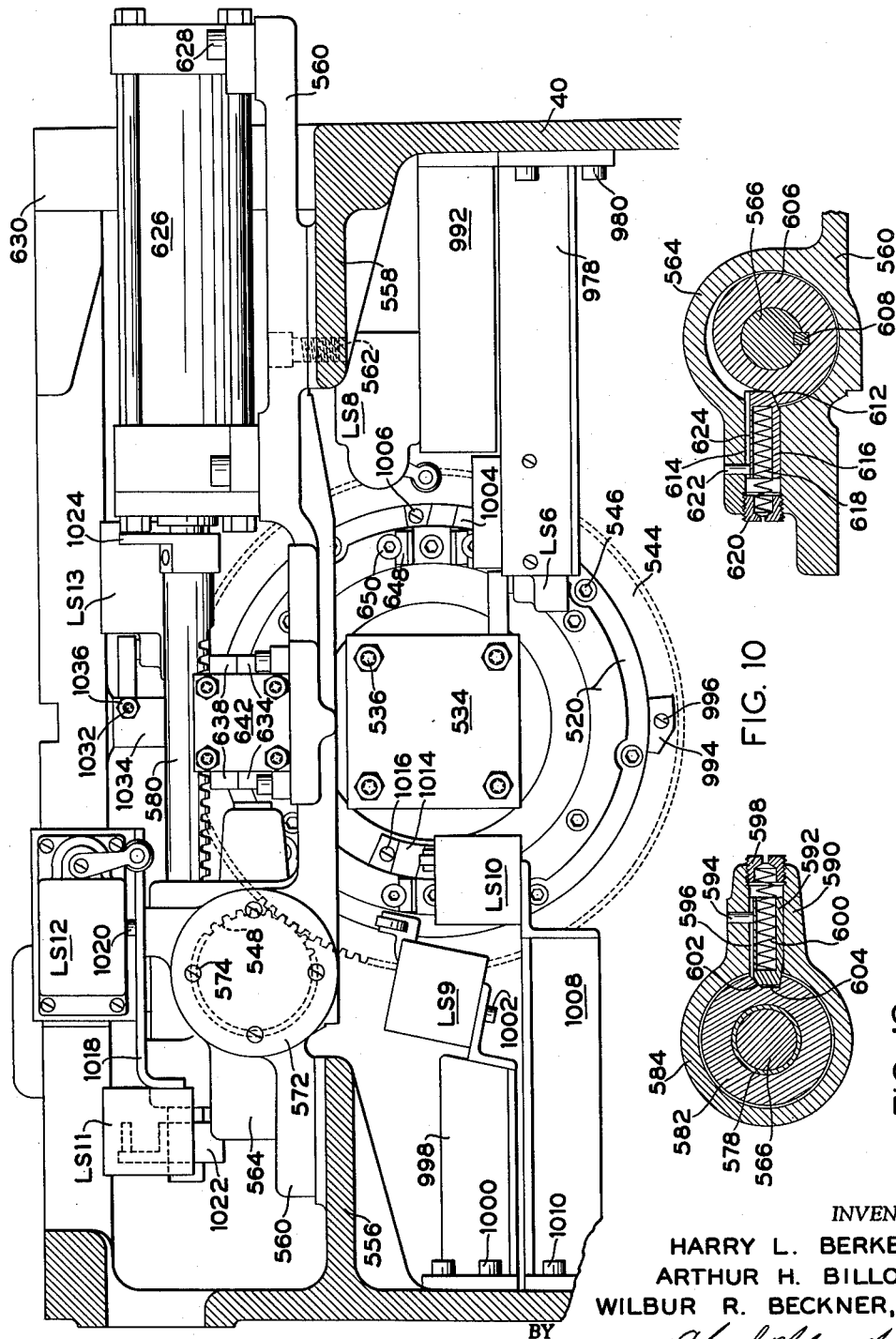

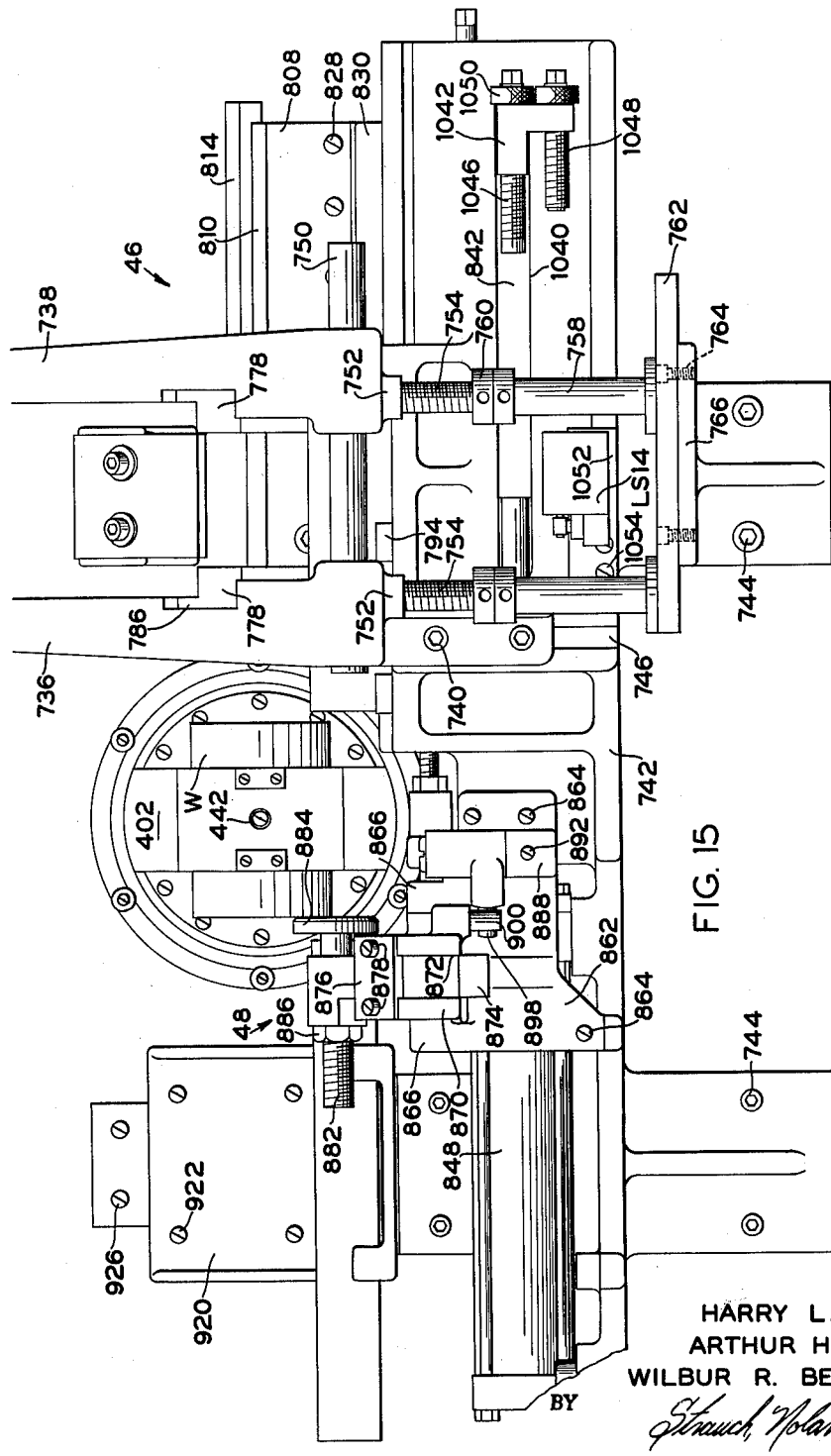

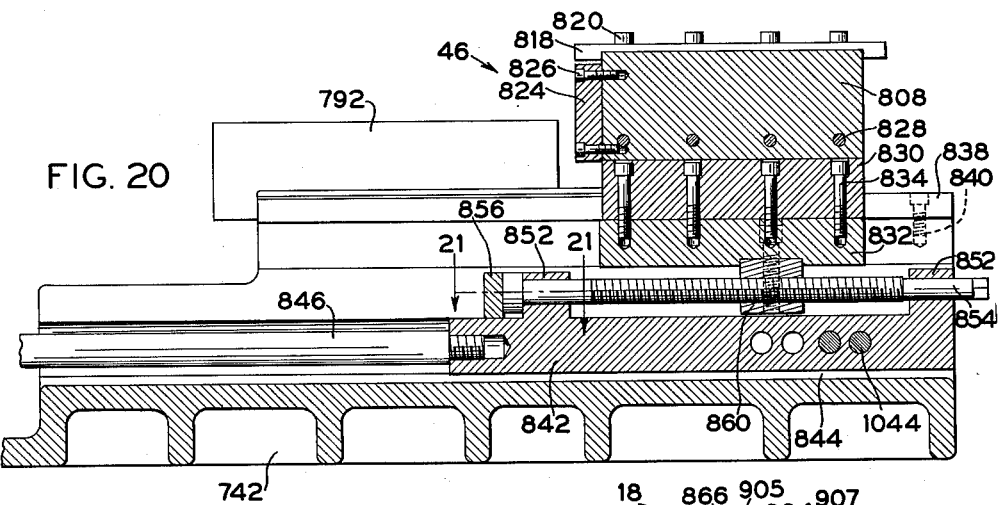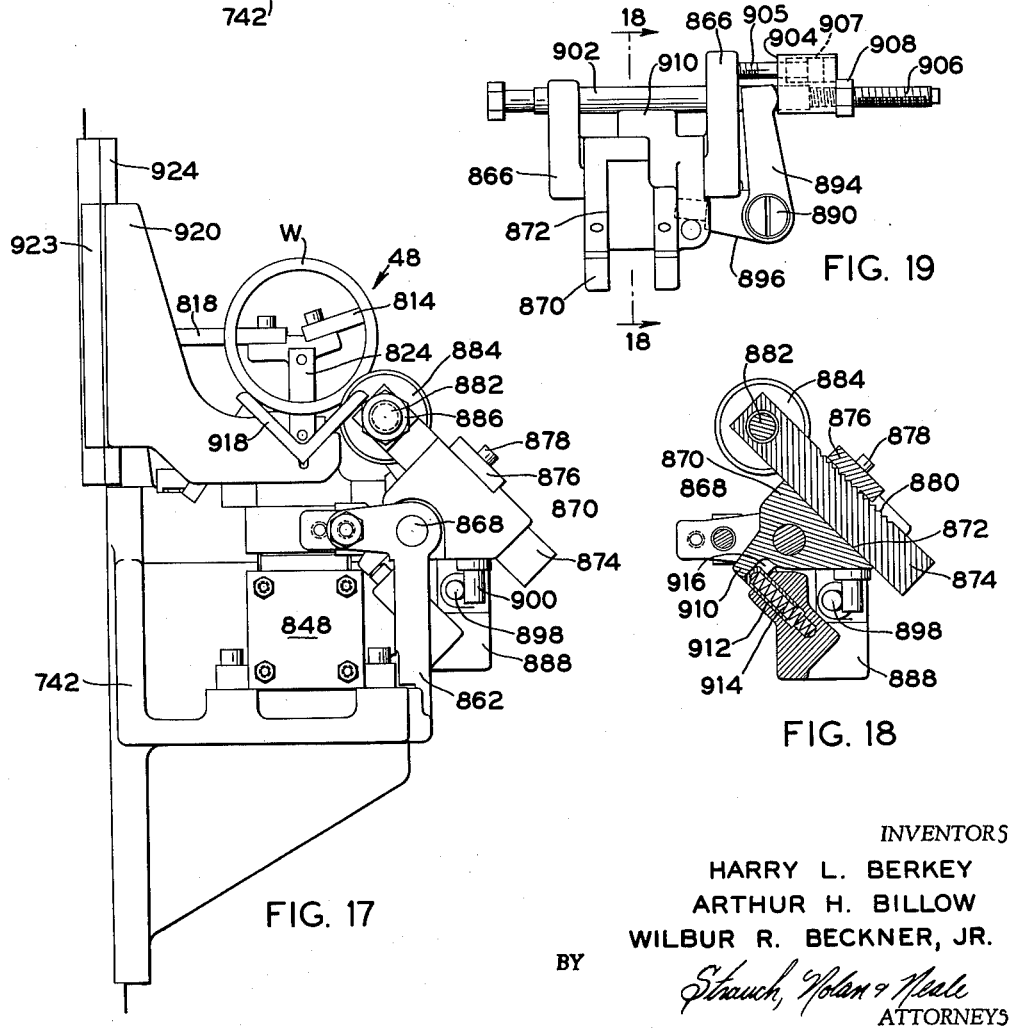

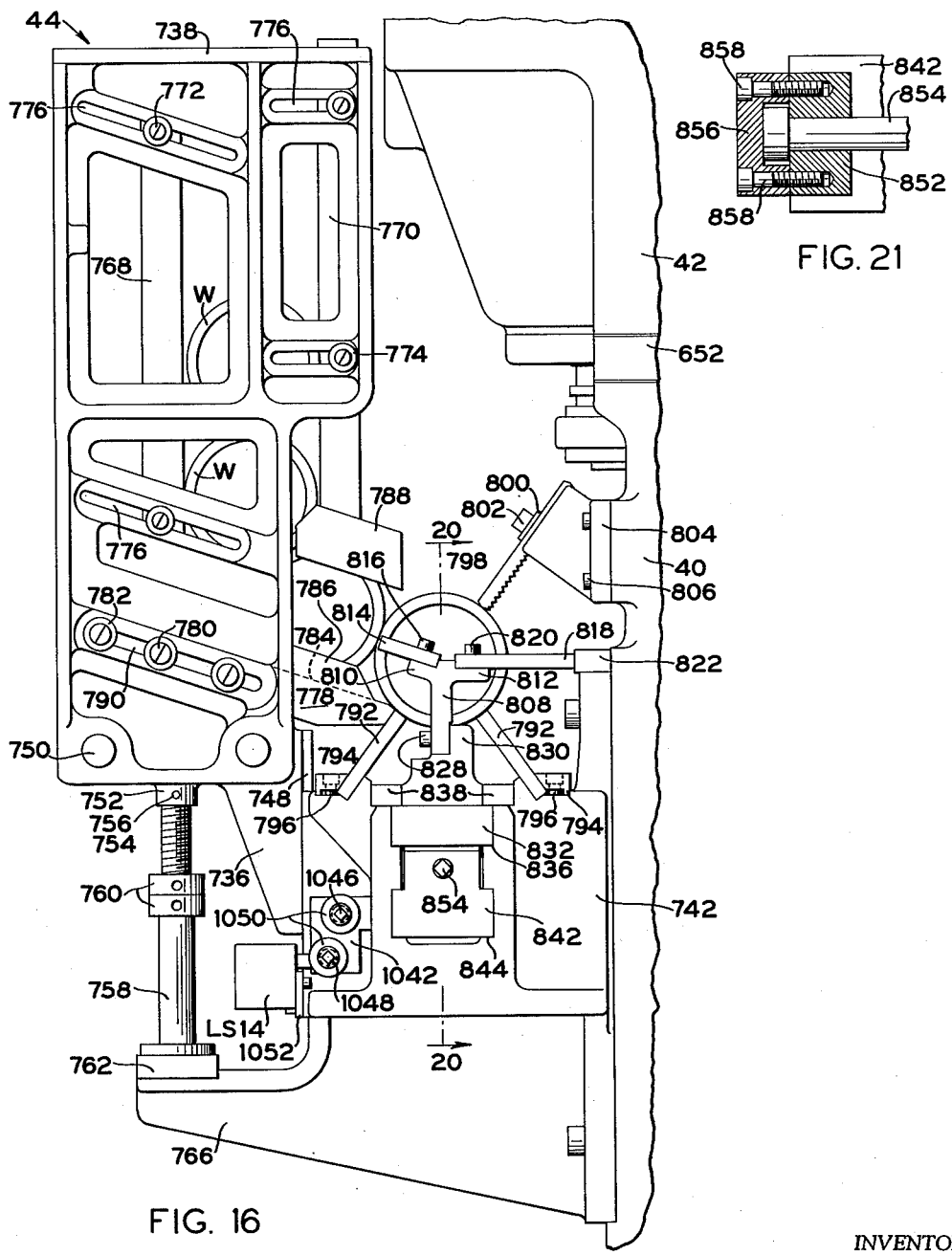

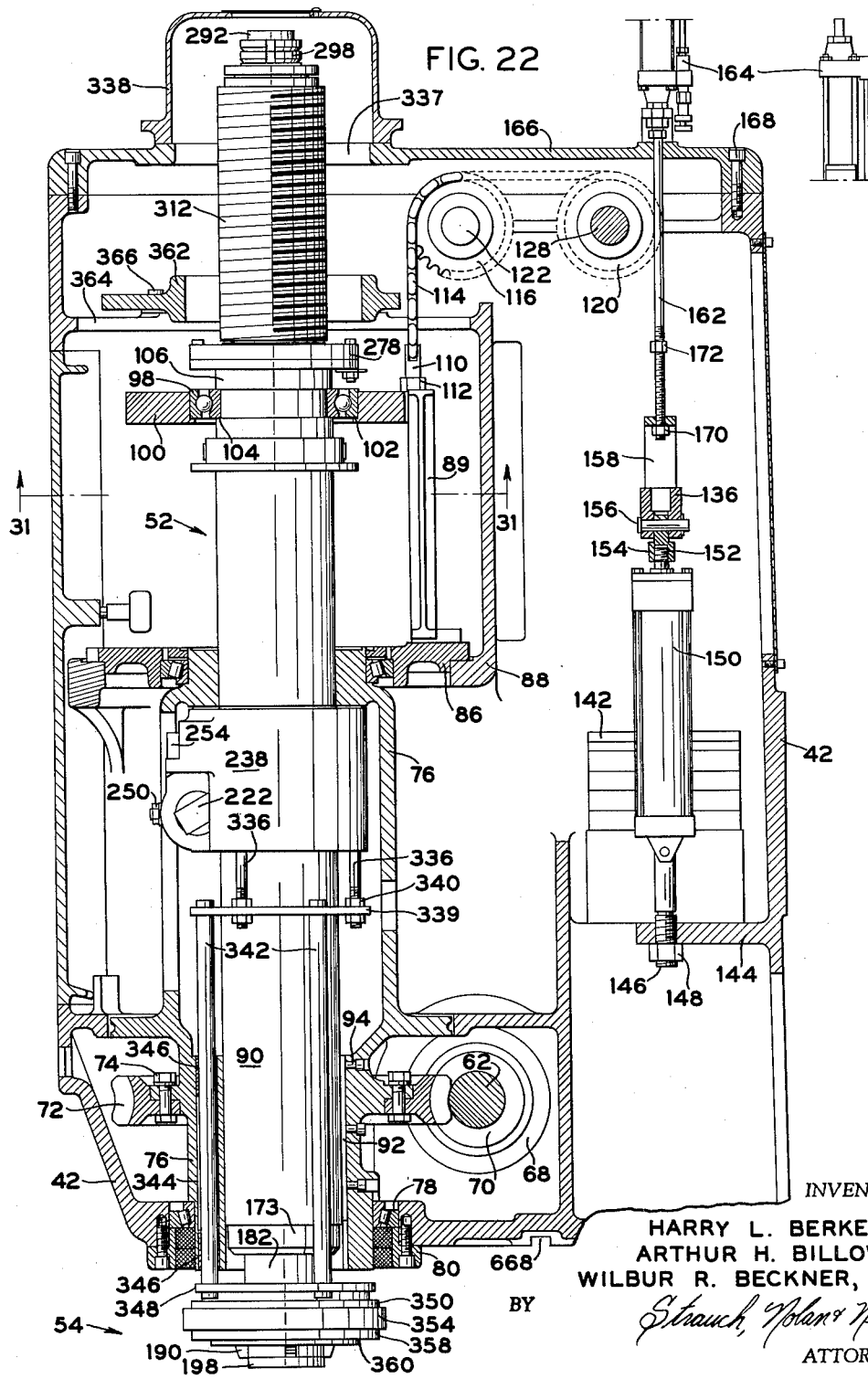

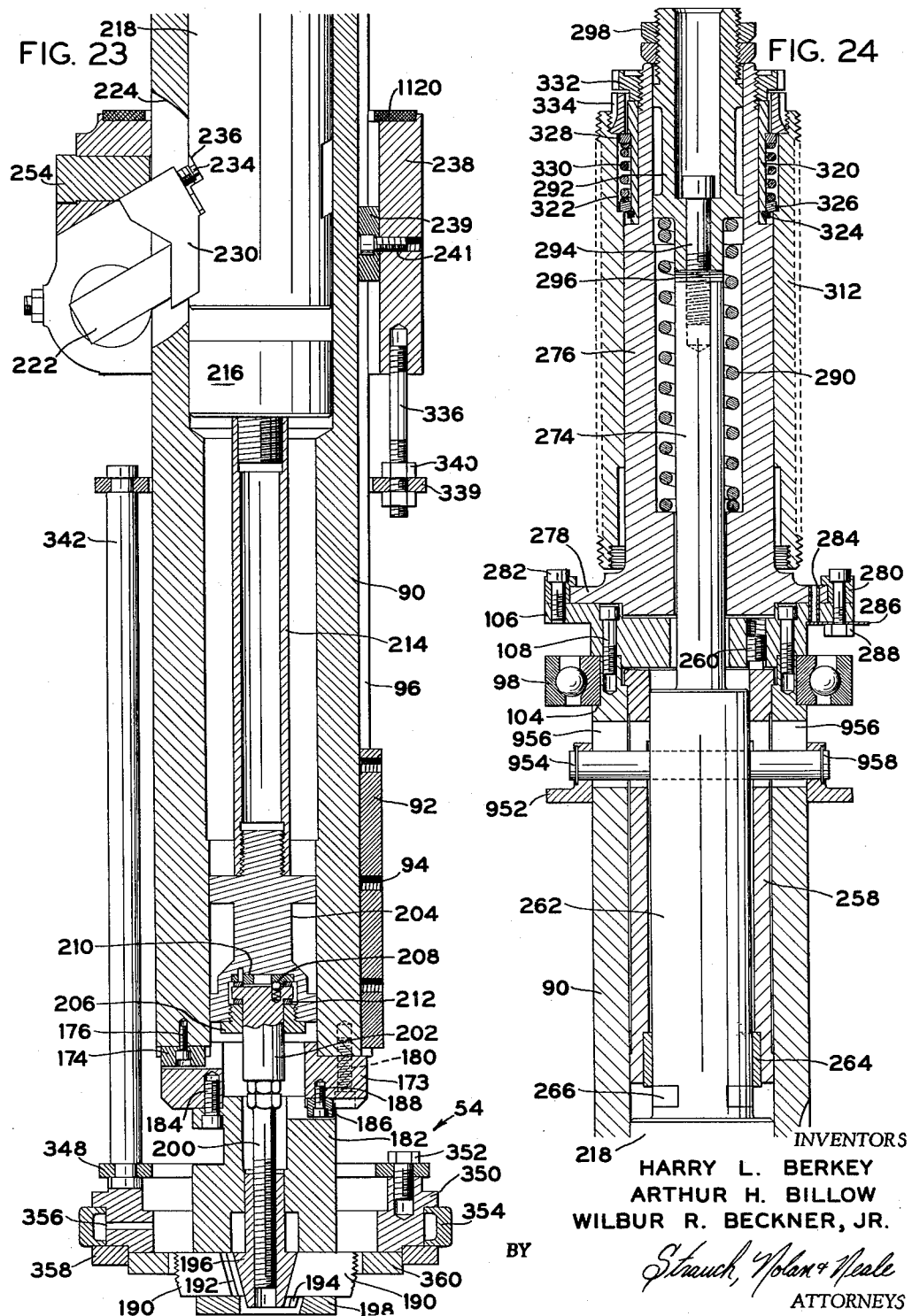

Oct. 30, 1962  H. L. BERKEY ETAL  3,060,467
PIPE COUPLING TAPPING MACHINE WITH INDEXABLE WORK CHUCK
Filed June 17, 1957  17 Sheets-Sheet 13

INVENTORS
HARRY L. BERKEY
ARTHUR H. BILLOW
WILBUR R. BECKNER, JR.
BY
*Strauch, Nolan & Neale*
ATTORNEYS Oct. 30, 1962 H. L. BERKEY ETAL 3,060,467
PIPE COUPLING TAPPING MACHINE WITH INDEXABLE WORK CHUCK
Filed June 17, 1957 17 Sheets-Sheet 14

INVENTORS
HARRY L. BERKEY
ARTHUR H. BILLOW
WILBUR R. BECKNER, JR.
BY
Strauch, Nolan & Neale
ATTORNEYS Oct. 30, 1962     H. L. BERKEY ETAL     3,060,467
PIPE COUPLING TAPPING MACHINE WITH INDEXABLE WORK CHUCK
Filed June 17, 1957     17 Sheets-Sheet 15
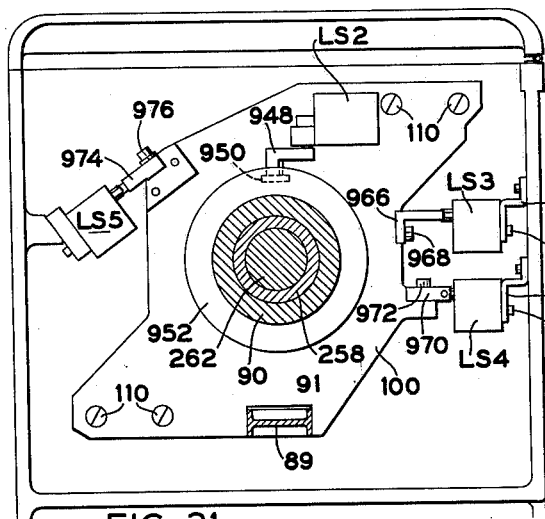
FIG. 31
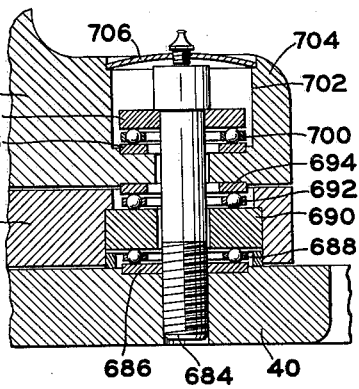
FIG. 33
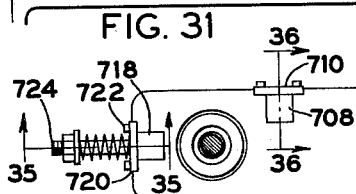
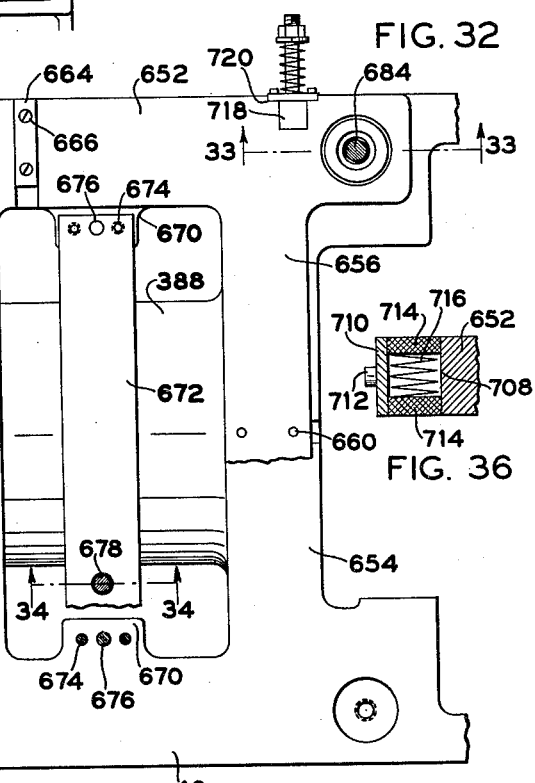
FIG. 32
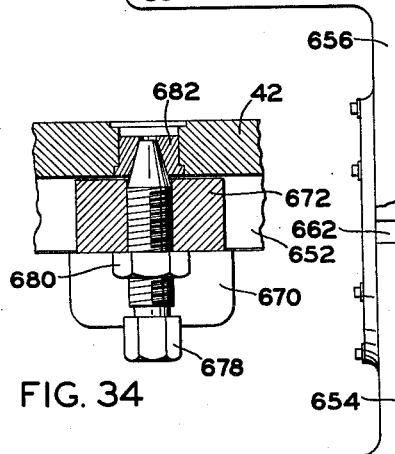
FIG. 34
FIG. 36
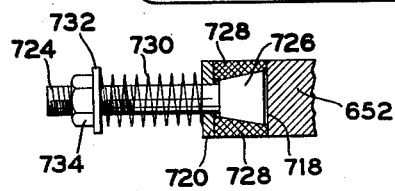
FIG. 35
INVENTORS
HARRY L. BERKEY
ARTHUR H. BILLOW
WILBUR R. BECKNER, JR.
BY *Strauch, Nolan & Neale*
ATTORNEYS

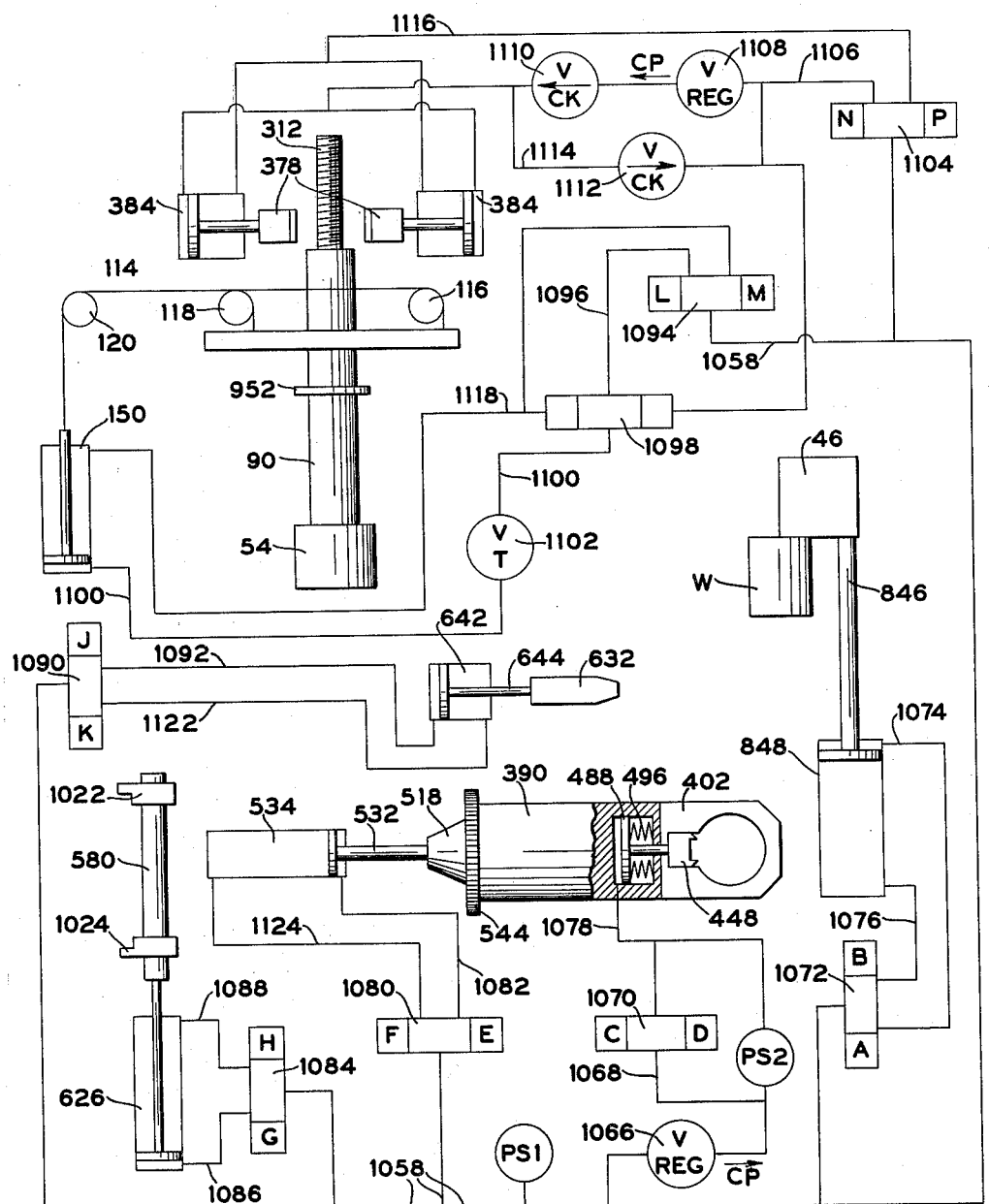
FIG. 37
INVENTORS
HARRY L. BERKEY
ARTHUR H. BILLOW
WILBUR R. BECKNER, JR.
BY
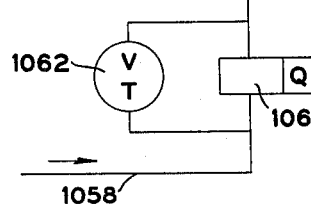
ATTORNEYS Oct. 30, 1962  H. L. BERKEY ETAL  3,060,467
PIPE COUPLING TAPPING MACHINE WITH INDEXABLE WORK CHUCK
Filed June 17, 1957  17 Sheets-Sheet 17
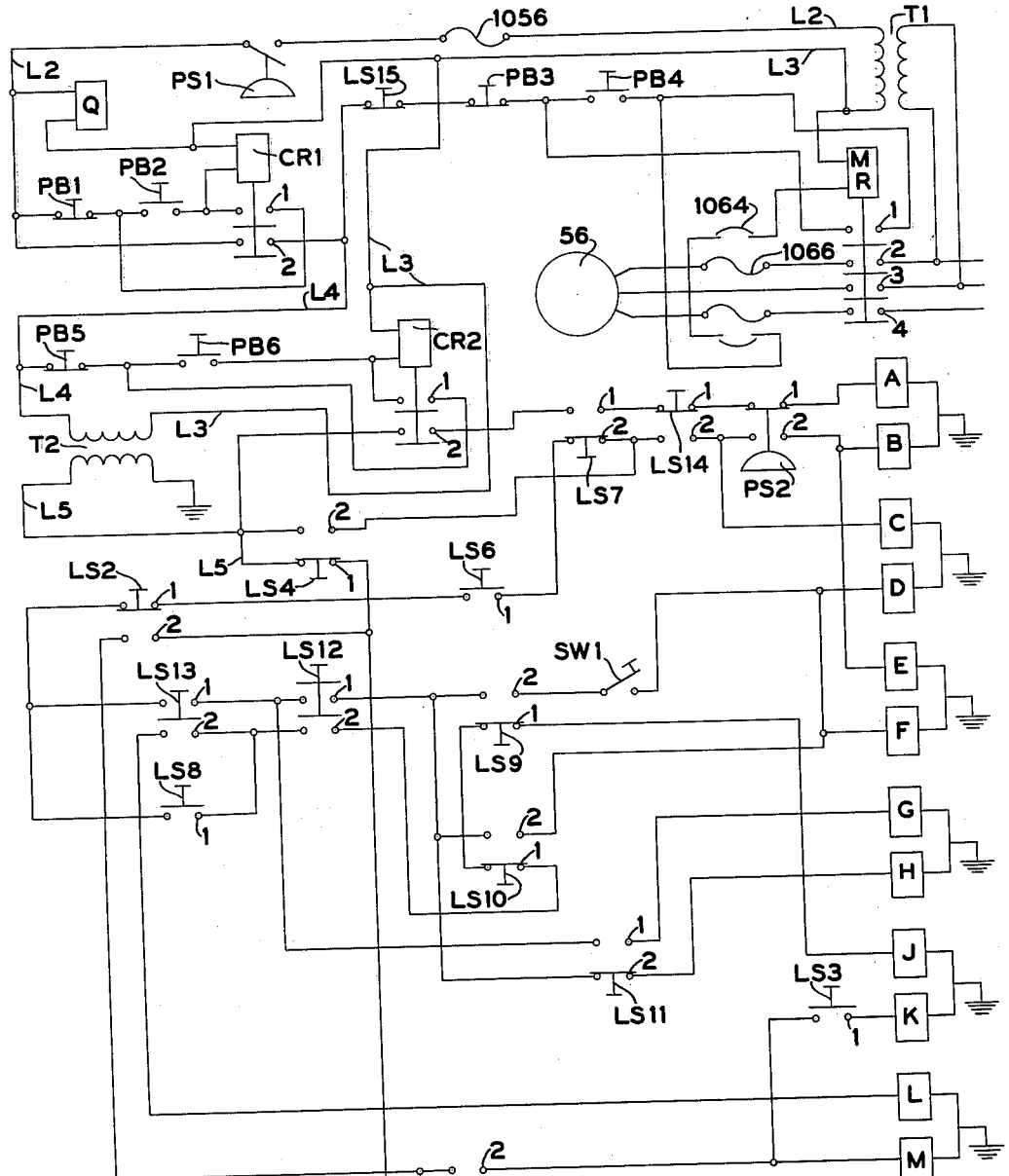
FIG. 38
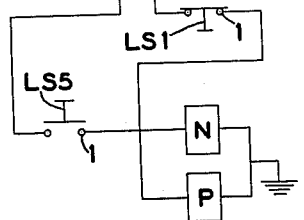
*INVENTORS*
HARRY L. BERKEY
ARTHUR H. BILLOW
WILBUR R. BECKNER, JR.
BY
*Strauch, Nolan & Neale*
ATTORNEYS 3,060,467
PIPE COUPLING TAPPING MACHINE WITH
INDEXABLE WORK CHUCK
Harry Law Berkey, Arthur Harrison Billow, and Wilbur Ripple Beckner, Jr., Waynesboro, Pa., assignors to Landis Machine Company, Waynesboro, Pa., a corporation of Pennsylvania
Filed June 17, 1957, Ser. No. 665,963
19 Claims. (Cl. 10—139)

This invention relates to machines for tapping pipe couplings or the like. The machine of the invention, while particularly intended for the generation of internal threads in pipe couplings, may also be adapted to perform other internal machining operations on such work pieces.

Machines of this general class, as exemplified by that shown and described in U.S. Patent No. 2,206,031, issued July 2, 1940, comprise a tool-carrying spindle, usually arranged vertically, and a work-holding device or chuck positioned in operative relation to the spindle. The spindle is driven rotatively and is arranged for rectilinear movement toward and from the chuck, that is, axially of the work piece held in the chuck.

The prior art machines are generally designed for semi-automatic operation, that is, the operative cycle, from the closing of the chuck upon a blank work piece to the opening of the chuck to release a finished coupling, is carried out automatically without the intervention of the operator. The loading, however, is effected manually, the operator being required to place the work blank between the jaws of the chuck and then to actuate a switch or valve to initiate the work cycle.

In contrast thereto, the machine of the invention operates fully automatically, the work blanks being placed between the open jaws of the chuck by automatic means which may receive them from a magazine or storage device. The many advantages of increased production, decreased cost, etc. in thus eliminating the services of an operator are well known. In addition, the automatic loading and unloading means permits, for the first time, the insertion of such coupling tapping machines into an automated production line in accordance with modern industrial practices.

A further disadvantage of prior machines resides in the provision therein of a support plate below the chuck which is required to facilitate the manual location of the work blank and to support the work blank prior to the closing of the chuck. With the aligned axes of spindle and work piece in a vertical position, as is generally the case, the support plate is necessarily in a position to catch the chips and other debris of the machining operation, a condition making it impossible accurately to position the next succeeding work blank without first carefully cleaning the plate.

This disadvantage is obviated in the machine of the invention by loading the work blank in the chuck with the axis of the work disposed horizontally and with the work stop not only arranged vertically but located a considerable distance laterally from the working position of the cutting tool. This necessitates rotating the chuck from the working position in which its side faces are horizontal to hold the work axis vertical, into a loading position in which the side surfaces of the chuck are vertical to receive and discharge work pieces whose axes are horizontal.

Loading the blank couplings into the chuck with their axes horizontally disposed provides the further important advantage over the prior art that the blanks may be permitted to roll individually from a magazine or the like onto the chuck loading means, thus taking advantage of the elementary but significant fact that a cylinder supported on its circumference will roll while one supported on its end must be carried. Transfer of the work pieces from and to other machines of the production line is thus greatly facilitated by simple means. Furthermore, where a magazine is used, the novel loading mechanism may be placed at one side of the machine spindle rather than directly in front thereof, to allow ready access to the cutting tools.

To permit the above-described type of chuck operation, the chuck itself is constructed so that the opening and closing mechanism is contained within the cylinder on which the chuck is mounted. That is, the opening and closing mechanism travels with the chuck in its reciprocatory and rotative movements. Only a single grip is operated to seize and release the work pieces, whereby the number of working parts, and consequently wear, is minimized in contrast to the conventional chuck having three movable jaws. The use of three movable jaws in a machine operating on pipe couplings has been found to be unnecessary since its primary function is that of accurately centering the outside circumference of the work with respect to the tool-carrying spindle. Since the machine is intended to operate on the interior of the coupling and since the internal and external circumferences are not necessarily concentric, centering the external circumference is a superfluous manoeuver.

Machines of the prior art have obtained concentricity between tool and work piece by permitting either the chuck or the tap to float freely relative to its mounting. It has been found that such construction often causes a surface defect known as "chatter" on the threads cut and in any case requires excessive time to align the tool with the work with the additional result that one or more of the threads at the start of the cut are malformed.

In the machine of the invention these disadvantages are eliminated by causing the entire top portion of the machine, including the headstock, spindle, tap, motor and counterweights, to float relative to the fixed base. The substantial mass of these parts, which constitute the major portion of the weight of the entire machine, effectively dampens vibration and permits the tool to center itself very quickly with respect to the work piece. Additional damping means is associated with the float means to further eliminate random movement of the floating members.

Since the typical work piece to which this machine is especially adapted is provided with tapered threads, the tapping mechanism includes means for causing the thread-cutting chasers to recede from a maximum diameter at the start of a cut, at a constant rate depending on the taper desired. In prior art machines, the mechanism for causing the chasers to recede is commonly incorporated with the tap itself. In the machine of the invention, on the other hand, the receding means is built into the spindle, thereby reducing the number of parts in the tap proper to the bare minimum. This has the important advantage of permitting the main spindle bearing to be located very close to the cutting tools, thus providing maximum rigidity at the point where it is most effective in insuring accurately formed and smoothly finished threads.

Two different cycles of automatic operation are provided in the new machine. In one, for operation on the more common type of coupling in which a separate thread is cut from each end toward the middle, provision is made to perform two thread-cutting operations, the work piece being reversed end-for-end between them. The other cycle, for use in tapping couplings and similar articles having only a single thread, the threaded coupling is discharged and another loaded after only one threading operation, without reversing the coupling. Either cycle may be selected by the manual operation of a single switch.

Accordingly, an object of the present invention is to provide a machine for tapping pipe couplings and the like which will be completely automatic in operation, including mechanism for loading and unloading, to permit the machine to be installed in an integrated production line.

A further object is to provide automatically operated loading and unloading mechanism for such a machine such that the work piece enters and leaves the machine with its axis horizontal thereby greatly facilitating handling of the work pieces and eliminating the interference of chips, etc. with the loading mechanism.

A still further object is to provide, in the machine described above, a work-holding device which will receive the work blank with its axis horizontal, then rotate it 90 degrees to present it, with vertical axis to the cutting tools.

A further object is to provide automatic control means to discharge the work piece and reload after one threading operation or, selectively, to rotate the work holding device 180 degrees for a second threading operation before terminating the cycle.

Another object of the invention resides in the provision of fluid-operated means for opening and closing the work-holding device which is integrated with said device and participates in its rotary and reciprocatory movements.

A further object of the invention is to provide a machine in which the chaser-receding mechanism is incorporated into the tool-carrying spindle in a position remote from the tool.

It is a still further object to mount the headstock and the parts carried thereby in floating relation with respect to the work holding device.

The numerous collateral objects and advantages which derive from the generaly massive construction of the machine with facile and rapid operation will be apparent from the following description and the accompanying drawings, in which:

FIGURE 3 is a broken, vertical section through the center of the bed of the machine, showing the chuck in tapping position;

FIGURE 5 is a transverse section of the chuck drum taken along line 5—5 of FIGS. 4 and 7;

FIGURE 6 is a longitudinal section showing the chuck operating mechanism and taken along line 6—6 of FIG. 5;

FIGURE 8 is a transverse section of the chuck drum taken along line 8—8 of FIG. 3;

FIGURE 9 is a partial vertical plan view of the bed of the machine with the cover and headstock removed and showing the chuck indexing mechanism;

FIGURE 10 is a vertical section taken substantially along line 10—10 of FIG. 9;

FIGURE 11 is a fragmentary sectional view taken substantially along line 11—11 of FIG. 9;

FIGURE 12 is a fragmentary sectional view taken along line 12—12 of FIG. 11;

FIGURE 13 is a fragmentary sectional view taken along line 13—13 of FIG. 11;

FIGURE 14 is a fragmentary sectional view taken along line 14—14 of FIG. 3;

FIGURE 15 is a partial front elevation of the machine showing the work stop and the loading mechanism at an enlarged scale;

FIGURE 16 is an elevation of the parts shown in FIG. 15 as seen from the right side thereof;

FIGURE 17 is an elevation of the parts shown in FIG. 15 as seen from the left side thereof;

FIGURE 18 is a fragmentary sectional view taken along line 18—18 of FIGURE 19;

FIGURE 19 is a top plan view of the work stop mechanism with certain parts thereof removed;

FIGURE 20 is a partial sectional view taken along line 20—20 of FIG. 16;

FIGURE 21 is a fragmentary sectional view taken along line 21—21 of FIG. 20;

FIGURE 22 is a vertical section through the upper portion or headstock of the machine, taken along line 22—22 of FIG. 1;

FIGURE 23 is a vertical section through the lower portion of the machine spindle and the tap, also taken along line 22—22 of FIG. 1;

FIGURE 24 is a vertical section through the upper portion of the machine spindle, also taken along line 22—22 of FIG. 1;

FIGURE 31 is a horizontal sectional view through the headstock taken along line 31—31 of FIG. 22;

FIGURE 32 is a partical top plan view of the machine with the headstock removed and showing the float device;

FIGURE 33 is a fragmentary sectional view taken along line 33—33 of FIG. 32;

FIGURE 34 is a fragmentary sectional view taken along line 34—34 of FIG. 32;

FIGURE 35 is a fragmentary sectional view taken along line 35—35 of FIG. 32;

FIGURE 36 is a fragmentary sectional view taken along line 36—36 of FIG. 32;

FIGURE 37 is a schematic representation of the pneumatic operating circuit employed in the machine; and FIGURE 38 is a diagram of the electrical control circut used in the machine.

Figure 1:
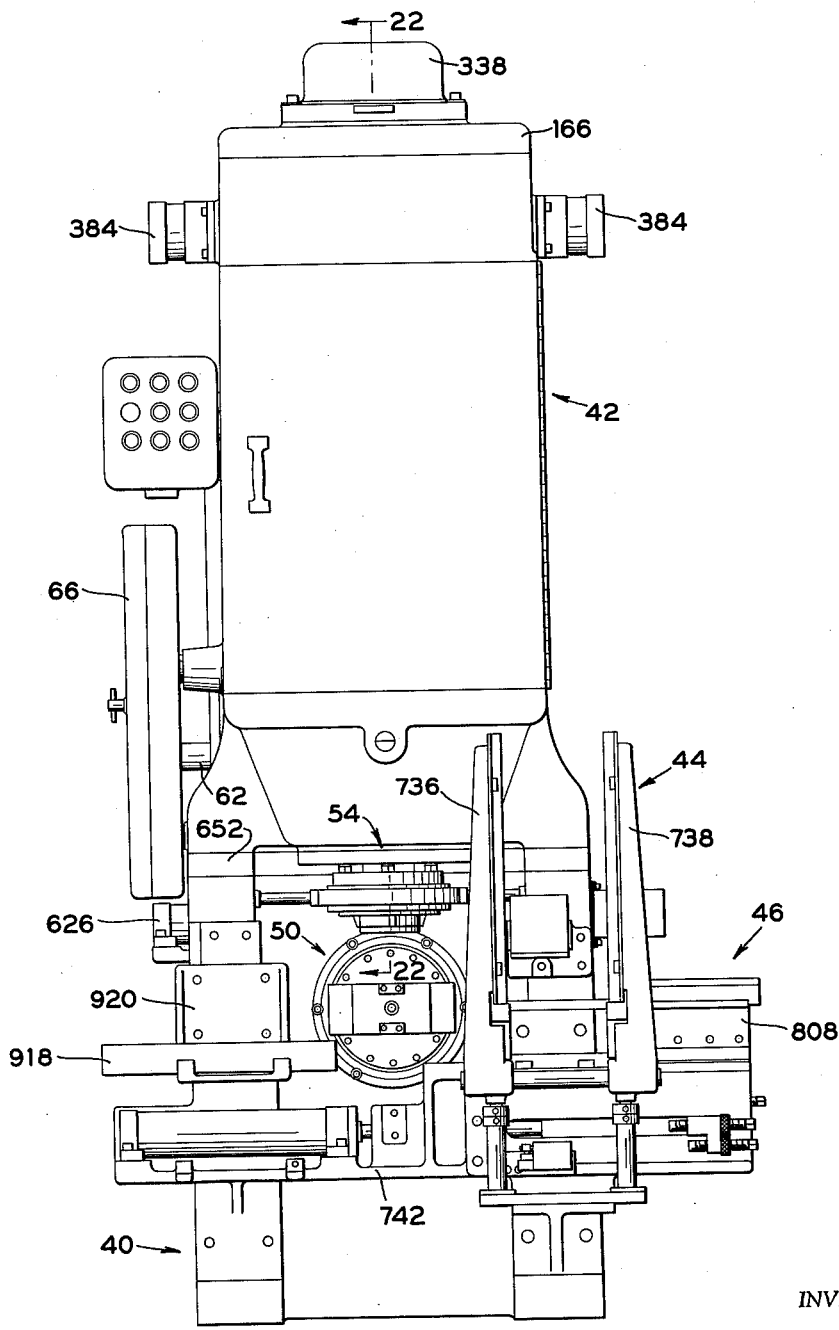
FIGURE 1 is a front elevation of the assembled machine with the work stop mechanism removed.
Figure 2:
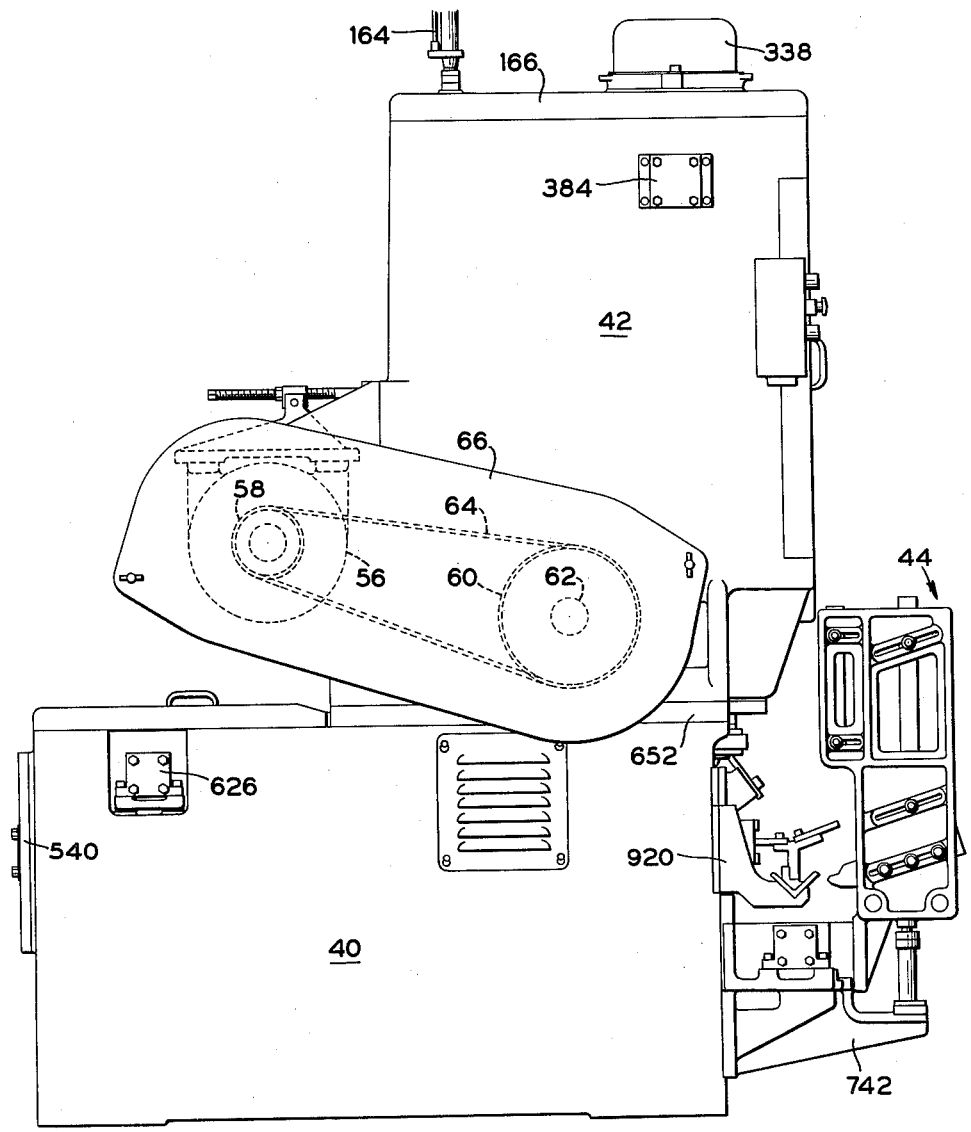
FIGURE 2 is a side elevation thereof.

As shown in FIGS. 1 and 2, the coupling tapping machine comprises as its chief structural elements a base 40 and a headstock 42. The base 40 supports a magazine 44, a loading mechanism 46, a work stop or locating mechanism 48 (FIG. 15) and a chuck mechanism indicated generally at 50. The headstock portion 42 contains a spindle mechanism 52 (FIG. 22) with tap 54 attached, both vertically arranged and aligned with the center of the chuck when the latter is in working position as shown. An electric motor 56 is conventionally and adjustably attached to the rear wall of headstock 42 and is provided with a V-belt sheave 58. A second sheave 60 is mounted, externally of one side wall of headstock 42, on a shaft 62 and is drivingly connected with motor sheave 58 by a V-belt 64. The sheaves and belt are protected against dirt by a cover 66.

The major components of the machine will be described under appropriate headings.

Spindle and Spindle Operating Mechanism

The shaft 62 is journalled in anti-friction bearings 68 (FIG. 22) in opposite side walls of headstock 42 in well known manner and supports intermediate its ends a worm 70. The worm 70 meshes with a worm wheel 72 which is secured by means of bolts 74 to a sleeve 76 constituting a part of the spindle mechanism 52. Sleeve 76 has its lower end rotatably journalled in anti-friction bearings 78 mounted in the bottom wall of headstock 42 and retained therein by means of a bearing cap 80 which is secured to the headstock 42 by screws 82. Sealing means 83 is provided between the cap 80 and sleeve 76 to retain lubricant in the headstock and to exclude dirt. The upper end of sleeve 76 is rotatably journalled in anti-friction bearings 84 mounted in an annular bracket 86 which is secured to an intermediate web 88 of the headstock 42. Thus, the driving force of motor 56 is transmitted to the sleeve 76 through sheaves 58 and 60, belt 64, shaft 62, worm 70 and worm wheel 72.

A spindle 90 is journalled in the lower portion of sleeve 76 for sliding movement axially thereof. A key 92 is secured in the interior of sleeve 76 by means of screws 94 (FIG. 22) and engages a keyway 96 (FIG. 23) in the spindle 90 to insure that the rotative driving force is transmitted to the spindle from the sleeve 76 so that the latter and spindle 90 rotate as a unit. The spindle 90 projects upwardly through the sleeve 76 and beyond the upper end thereof is journalled in an anti-friction bearing 98 mounted in a plate 100. The bearing 98 is retained axially in position in plate 100 between a shoulder 102 on the plate, a shoulder 104 on the spindle 90, and a surface of a flange 106 which is secured to the top end surface of spindle 90 by means of screws 108 (FIG. 24). Thus the entire weight of the spindle 90 and the tap 54 attached to the lower end thereof is suspended from the plate 100.

The bracket 86, secured to web 88 by the screws 87 (FIG. 30), has mounted thereon an upright bracket 89 (FIG. 22) having finished opposite side surfaces which extend upwardly to engage the opposite sides of a rectangular recess 91 in plate 100 (FIGS. 30 and 31) and thus stabilize the plate against any tendency to rotate.

Figure 30:
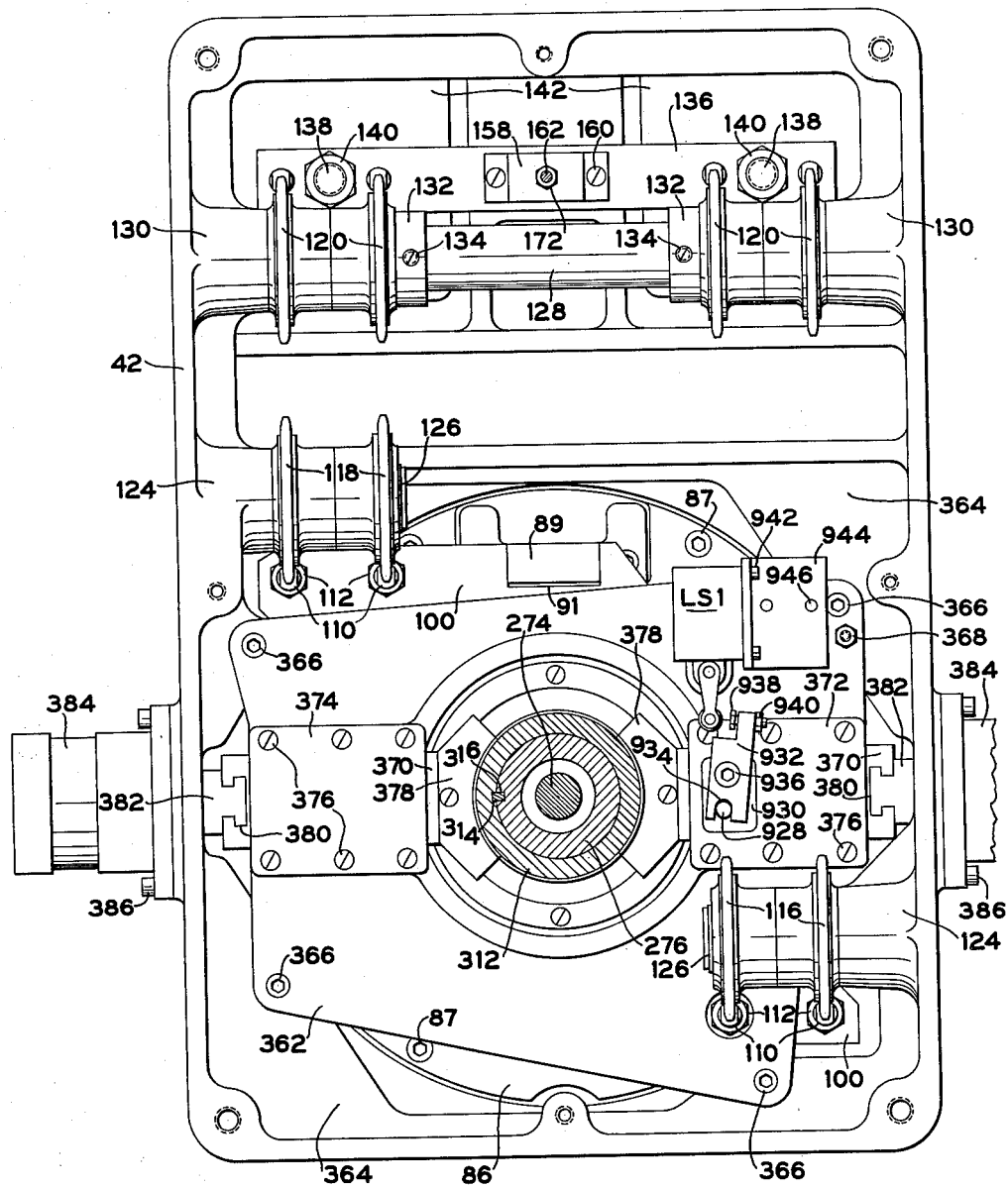
FIGURE 30 is a top plan view of the headstock with the top cover removed.

As shown in FIGS. 22, 30 and 31, the plate 100 has two pairs of upwardly-directed cap screws 110 secured thereto at diagonally opposite corners thereof by nuts 112. These screws serve as a means for attaching to the plate 100 four chains 114 which are passed upwardly over sprockets 116 and 118, extend toward the rear of the headstock and downwardly over sprockets 120. The sprockets 116 and 118 are journalled in pairs on stub shafts 122 mounted in bosses 124 which are formed integrally with the headstock 42. Conventional snap rings 126 are employed to retain sprockets 116 and 118 on their respective shafts. Since the two rear pairs of sprockets 120 are in axial alignment, they may be journalled on a shaft 128 extending across the interior of the headstock and supported in bosses 130 formed integrally with the opposite side walls thereof. A pair of collars 132 with set screws 134 is employed to retain sprockets 120 in proper axial position.

Below sprockets 120, each of the four chains 114 is attached by conventional means to a bar 136. Between each pair of chains 114, a rod 138 is secured to the bar 136 by nuts 140, extending downwardly therefrom. A number of weights 142 are attached to the lower end of each of the two rods 138 and depend therefrom into loosely fitting recesses cast into the headstock 42. Thus it will be seen that the weight of the spindle 90 and its attached parts is counterbalanced by the weights 142 and that the mass of spindle and weights is supported on the shafts 122 and 128. In practice it has been found preferable to make the weights 142 substantially heavier in the aggregate than the spindle 90 in order to bias the latter upwardly.

A relatively small horizontal shelf 144 is formed integrally with the headstock 42 and has a tapped hole to receive a threaded rod 146 (FIG. 22) which is held therein by a lock nut 148. To the upper end of rod 146 is pivotally attached the head end of an air cylinder 150 whose threaded piston rod 152 is screwed into an internally threaded member 154. The member 154 is pivotally attached by a pin 156 to the center of the bar 136. The function of the cylinder 150, as will be seen in detail later, is to lift the bar 136 and therefore the weights 142 to allow the spindle 90 to move downwardly.

A bracket 158 is also secured to the upper surface of the bar 136 as by means of screws 160 (FIG. 30). Through the bracket 158 is passed the piston rod 162 of a well known hydraulic check device 164 mounted upon the top cover 166 which is fastened to the top of the headstock by screws 168. A pair of nuts 170 and 172 is mounted on the piston rod 162, respectively below and above the bracket 158.

*Tap and Tap Control Mechanism*

An adapter 173 is employed to fasten the tap 54 to the spindle 90. A key 174 is secured in the lower end face of spindle 90 by means of a screw 176, to engage a mating keyway in the opposed upper surface of the adapter 173 which is centered in the spindle 90 and attached thereto by screws 180 (FIG. 23). The tap 54 is largely conventional in structure and comprises a head member 182 centered in the adapter 173 and secured thereto by screws 184. A key 186 is secured in the lower face of adapter 173 by a screw 188 to engage a mating keyway in the tap head 182. Thus the keys 174 and 186 enable the spindle 90 to drive the tap head 182 rotatively. As is well-known in the art, the tap head 182 is provided with radial slots to receive the thread-cutting chasers 190 whose inner surfaces are inclined relative to the axis of the tap and are provided with integral keys 192 to engage mating keys 194 on the nose of a plunger 196. The chasers 190 are retained in the slots in the tap head by means of a cap 198.

The plunger 196 is threadedly engaged on a rod 200 which in turn is threaded into the lower end of a diameter adjusting member 202. The member 202 is inserted into the lower end of a connector 204 which fits freely in the bore of spindle 90. The flanged upper end of member 202 is retained in connector 204 by a threaded cap member 206. It will be apparent that the diametrical setting of chasers 190 is dependent upon the axial position of plunger 196 relative to that of the tap 182. Since the axial position of the tap head 182 is fixed relative to the spindle 90, the size adjustment of the chasers 190 is effected by rotation of the adjusting member 202 and rod 200 relative to the spindle. A spring pressed ball 208 is mounted in the top surface of adjusting member 202 to engage slight depressions in an opposed washer 210 pinned in connector 204 to serve as a detent for retaining member 202 in adjusted position. A pair of thrust washers 212 are mounted between the flanged head of adjusting member 202 and the opposed surfaces of cap 206 and washer 212.

Figure 28:
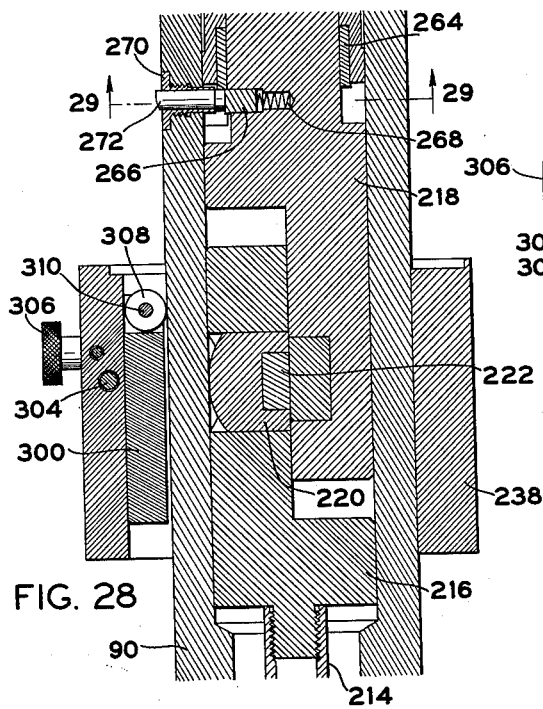
FIGURE 28 is also a fragmentary vertical sectional view through the axis of the chaser-receding mechanism, taken along line 28—28 of FIG. 26.
Figure 26:
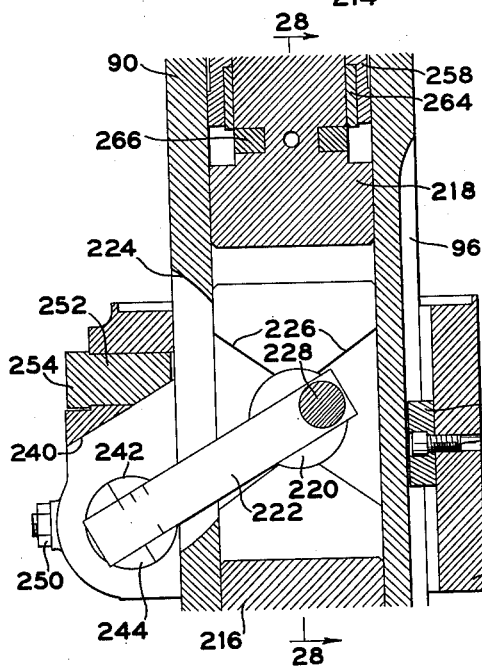
FIGURE 26 is a fragmentary sectional view of the chaser-receding mechanism taken along line 26—26 of FIG. 25 and looking toward the left.
Figure 27:
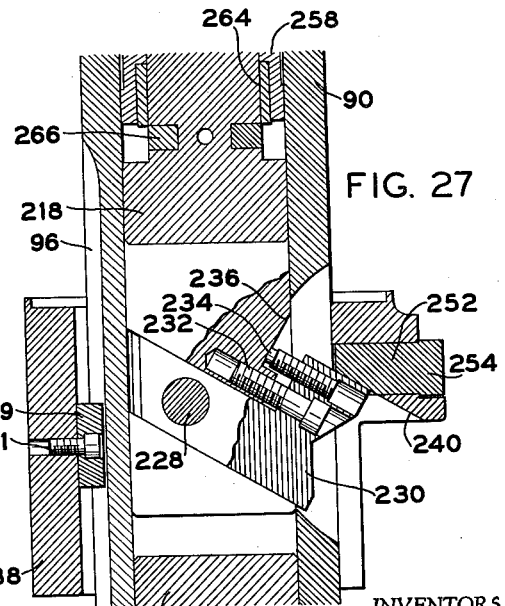
FIGURE 27 is a fragmentary sectional view similar to FIG. 26, also taken along line 26—26 of FIG. 25, but looking toward the right.

The member 204 is provided with an integral threaded stud on its top end which is screwed into a tube 214. The tube 214 extends upwardly in the interior of spindle 90 and is similarly screwed onto a threaded stud portion of a cylindrical slide member 216. As shown in FIGS. 26–28, the slide member 216 is partly cut away along a diameter to permit a similar upper slide member 218 to overlap it. The slide member 216 is provided with a transverse bore to receive a cylindrical plug 220. The centrally facing plane surface of plug 220 is provided with a rectangular recess to receive a taper lever 222. The lever 222 extends radially outwardly through an elongated opening 224 in the wall of spindle 90. The slide member 216 is also cut away further as at 226 to permit the lever to swing freely about its fulcrum at the center of plug 220.

On the inner end of lever 222 and beyond the center of plug 220, the lever has an integral cylindrical portion 228 extending laterally toward the adjacent slide part 218. This upper slide portion 218 is formed with a diagonal slot to receive a taper adjusting block 230, which has an opening to receive the portion 228 of lever 222. A cap screw 232 (FIG. 27) is passed through the outer end of block 230 and is screwed into the slide member 218. Parallel to screw 232, a set screw 234 is screwed into block 230 and abuts a surface 236 on slide member 218. By turning the screws 232 and 234 in opposite directions the radial position of block 230 can be adjusted to alter the distance between the centers of plug 220 and portion 228.

A receding collar 238 (FIG. 25) is slidably mounted on spindle 90 and is cut away as at 240 to permit the lever 222 and block 230 to extend thereinto. The collar 238 is prevented from rotating relative to spindle 90 by means of a key 239 secured to the interior of the collar by a screw 241. Key 239, like key 92, engages the keyway 96 in the spindle 90. The collar 238 is also provided with a transverse bore 242 to receive a cylindrical pivot 244 having a rectangular groove 246 intermediate its ends. A set screw 248 is threaded through the wall of bore 242 to engage the groove 246 and thus retain the pivot 244 in correct axial position. A nut 250 is provided to lock the screw 248 in position. The centrally facing end of pivot 244 has a rectangular slot therein to receive the outer end of taper lever 222 in closely fitting, sliding relationship.

Figure 25:
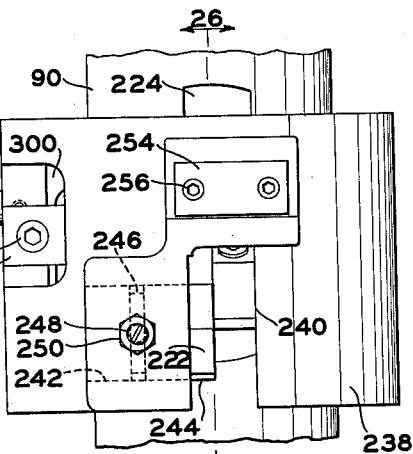
FIGURE 25 is an external view of that portion of the machine spindle carrying the chaser-receding mechanism.

As will be described in further detail below, in the operation of the machine the block 230 comes forcibly into contact with a surface of cut-away portion 240 as shown in FIG. 27. A cylindrical plug 252 is here inserted into collar 238 and has a beveled surface to coincide with the surface of cut-away portion 240. This inserted plug 252 may be hardened to better withstand the impact of block 230. The outer end of plug 252 is provided with a rectangular flange 254 which is secured by screws 256 to the exterior of collar 238 (FIG. 25).

A sleeve 258 (FIG. 24) is mounted in the upper end of spindle 90 by having its flanged upper end engage a suitable counterbore in the spindle. The flange 106 has set screws 260 threaded axially therethrough to engage the top end surface of sleeve 258 and hold that member in place. The slide member 218 has a reduced diameter portion 262 extending upwardly within sleeve 258 and the latter is provided with a counterbore at its lower end to receive a bushing 264 which projects a short distance beyond the end of sleeve 258 in close-fitting relation to the reduced diameter portion 262.

Figure 29:
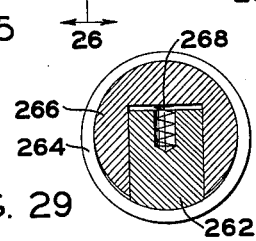
FIGURE 29 is a fragmentary sectional view taken along line 29—29 of FIG. 28.

As best shown in FIG. 29, the portion 262 has a rectangular groove formed therein to receive a horseshoe-shaped latch member 266 which is pressed radially outward from portion 262 by a spring 268 embedded in the latter. A radial opening in the wall of spindle 90 has threaded therein a bushing 270 (FIG. 28) which serves as a seat for the latch-tripping pin 272. The pin 272 is slightly enlarged inwardly of the bushing 270, whereby it is prevented from being forced outwardly through the bushing. The inner end of pin 272 engages the latch member 266 to permit it to be moved only a short distance beyond the periphery of portion 262 by the spring 268. This protruding portion of latch 266 engages peripherally the end of the above mentioned bushing 264 thus maintaining the tap 54 in latched position ready for thread-cutting, by preventing the upward movement of slide member 218 relative to spindle 90.

Upwardly of the portion 262, the slide member 218 is formed with a further reduced-diameter portion 274 surrounded by a tubular member 276 having a flange 278 at its lower end. The flange portion 278 is centered in flange 106 and is secured thereto by a clamping ring 280 through which are passed screws 282. A small piece of tubing 284, preferably of brass or other relatively weak material, may be passed through aligned holes in flanges 278 and 106 to serve as a shear pin. A thin plate 286, held to the lower side of flange 106 by a nut 288, screwed onto one of the screws 282, serves to retain the shear pin 284 in position.

The interior of member 276 is counterbored to receive a spring 290 which is held in compression in the counterbore by a spring retainer 292. The retainer 292 is secured to the upper end of slide portion 274 by a screw 294. A number of shims 296 may be inserted between the end of slide portion 274 and retainer 292 to adjust the load on spring 290. The upper end of retainer 292 is provided with a screw thread and a pair of lock nuts 298 is threadedly engaged thereon to engage the upper end of the member 276 to limit the downward movement of the retainer 292 with respect to the member 276. It will be apparent that the spring 290 provides the force for collapsing the tap chaser 190 when the latch 266 is released.

As shown in FIGS. 28 and 29, to release the latch, pressure must be applied to the external end of pin 272, which in turn depresses the latch 266 against the force of spring 268 until the latch loses contact with the adjacent end face of bushing 264. Thereupon the spring 290 forces the retainer 292 upwardly together with all the parts connected thereto including the chaser plunger 196, thus causing the tap chasers 190 to be withdrawn radially inwardly.

A mechanism (FIGS. 25 and 28) is attached to collar 238 to depress the pin 272 automatically. This mechanism comprises a bar 300 disposed lengthwise in a suitable recess in collar 238 and adjustably held therein by a clamp 302 and screw 304. When the screw 304 is loosened the bar 300 may be adjusted longitudinally as by a manually operated pinion 306. The upwardly directed end of bar 300 is bifurcated to receive a roller 308 which is rotatably mounted on a pin 310. The roller 308 is thus in position to depress the pin 272 and this effect is achieved whenever the collar 238 is moved upwardly far enough for the roller to make contact with the pin.

The collar 238 has three tapped holes in the lower end surface thereof to receive three (two shown, FIG. 22) studs 336. Near their lower ends the studs 336 are secured to a ring 339 by nuts 340. The ring 339 is provided with three additional openings in which are attached three (two shown) rods 342 which extend downwardly parallel to spindle 90 and through openings 344 in sleeve 76. A pair of bushings 346 are seated in each opening 344 to guide each rod 342 for movement in the axial direction. The lower ends of rods 342 are attached to a ring 348 surrounding the tap head 182.

A support ring 350 (FIG. 23) is secured to the lower side of ring 348 by screws 352. A coolant ring 354 is mounted on support ring 350 and the latter is provided with radial openings 356 to conduct coolant from the hollow interior of ring 354 to points near the cutting surfaces of the chasers 190 where it is discharged onto the work piece. The coolant ring 354 is held in position by a retaining ring 358 (attached by screws) to the lower end of support ring 350. Also screwed to the lower end of the support ring is a trip ring 360 whose function is to contact the end of the coupling work piece during the cutting operation, thus forcing the attached parts to stop while the spindle moves downwardly. This causes the relative motion between collar 238 and pin 272 to collapse the tap as described above.

Leadscrew Mechanism

The leadscrew mechanism is provided for accuracy of threading. This comprises a leadscrew 312 (FIGS. 24 and 30) mounted to fit closely upon the circumference of tubular member 276 and caused to rotate as a unit therewith by a key 314 seated in the peripheral surface of member 276 and engaging a keyway 316 in the bore of leadscrew 312. Bushing 320 is mounted on the reduced diameter upper end of member 276 and within a counterbore 322 in leadscrew 312. A retaining ring 324 is seated in a rectangular recess in the lower end of bushing 320 to retain in proper axial position a spring abutting ring 326. A shoulder near the upper end of bushing 320 serves as a stop for a second spring abutting ring 328 and a compression spring 330 is mounted between rings 326 and 328 and surrounds the bushing 320. The bushing 320 is held against axial movement relative to the member 276 by a nut 332 threaded onto the top end of member 276 and abutting the bushing 320. To complete the floating mounting of the leadscrew an annular member 334 is threadedly engaged in the end of leadscrew 312 between spring abutting ring 328 and a flange on nut 332. It will be apparent then that the leadscrew may be moved resiliently a small distance in either direction between the flange 278 and nut 332 to permit it to engage the threads of the leadscrew nuts without shock. This floating device may be eliminated with consequent added wear on leadscrew and nuts.

As shown in FIG. 22, the top headstock cover 166 is provided with an opening 337 to permit the top of the spindle mechanism to extend therethrough. A removable dome-like cover 338 is secured to the headstock cover 166 to protect the top of the spindle mechanism and to permit ready access to the leadscrew.

To support the leadscrew nut mechanism a bracket 362 (FIG. 30) is supported on webs 364 cast integrally with the headstock 42 and is secured to said webs by screws 366 and locating pins 368. The bracket 362 surrounds the leadscrew and has a pair of diametrically opposite slideways for nut slides 370. The slides 370 are retained for sliding movement in their slideways, toward and from the leadscrew 312, by cover plates 372 and 374 secured to bracket 362, by screws 376. Each of the opposed slides 370 has attached to the centrally facing end thereof a lead nut segment 378 provided with threads to engage the leadscrew 312 and encompassing approximately one-fourth of the circumference of the screw. The outer end of each slide 370 is formed with a T-slot 380 to engage the mating end of a piston rod 382 of a pneumatic cylinder 384. The cylinders 384 are mounted by screws 386 on opposite exterior walls of the headstock 42 which is perforated to permit the piston rods 382 to extend into the interior. It will be evident that movement of the pistons of cylinders 384 toward each other will cause the nut segments 378 to engage the leadscrew 312 and that movement of the pistons in the opposite direction will cause them to disengage.

Chuck and Chuck Closing Mechanism

Figure 4:
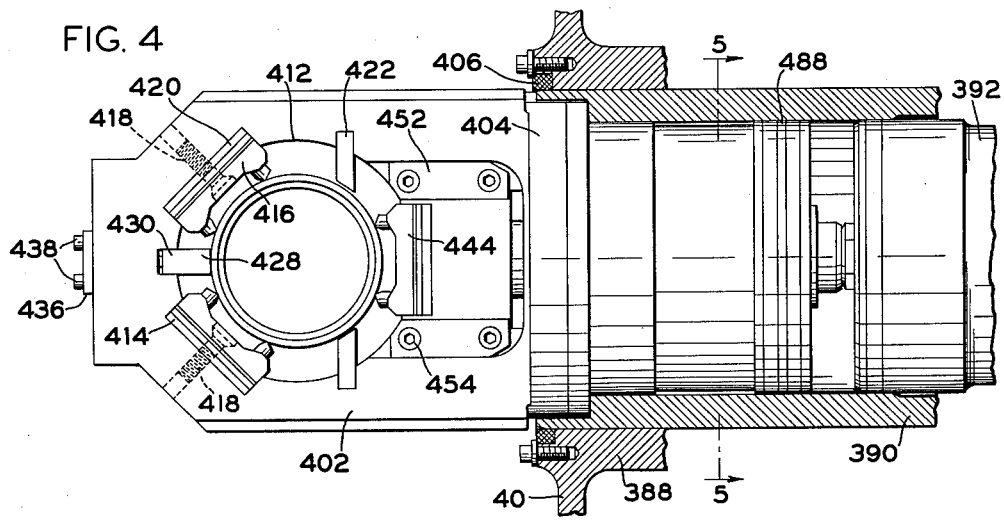
FIGURE 4 is a partial section similar to a portion of FIG. 3, but showing the chuck in loading position.

Referring now particularly to FIGS. 3 and 4, it will be seen that the base or bed 40 of the machine has cast integrally therewith a hollow cylinder 388 whose avis is aligned with that of the spindle 90 but is horizontal while that of the spindle 90 is vertically disposed. The cylinder 388 has mounted for reciprocal sliding movement therein a chuck drum 390 whose rearward end is occupied by a flanged sleeve 392 having a closed forward end 394. Screws 396 attach the flange of sleeve 392 to the rear end of drum 390 and thus maintain the sleeve in fixed position relative to the drum. Forwardly of sleeve 392, a member 398, also substantially in the form of a hollow cylinder is disposed in drum 390 and is held therein by screws 400. A flat chuck body 402 having an integral circular flange 404 at the rear end is mounted in the forward end of drum 390 and is also attached thereto by the screws 400 (FIG. 8). A seal 406 is mounted in the forward end of cylinder 388 to surround closely the drum 390 and to prevent its reciprocatory movement from carrying foreign matter into the interior of the cylinder. The seal 406 may be retained in position by a plurality of washers 408 and screws 410.

The chuck body 402 is provided with a circular opening 412 to permit a coupling to be inserted into the chuck to protrude from both sides. Two rectangular recesses 414 are cut into the walls of the opening 412 to serve as seats for a pair of stationary gripping jaws 416. Screws 418 are employed to retain the jaws 416 in the recesses 414. The work diameter range of each pair of jaws 416 may be increased by employing a number of shims 420 to be inserted between the jaws 416 and the bottoms of recesses 414, as shown in FIG. 4.

Figure 7:
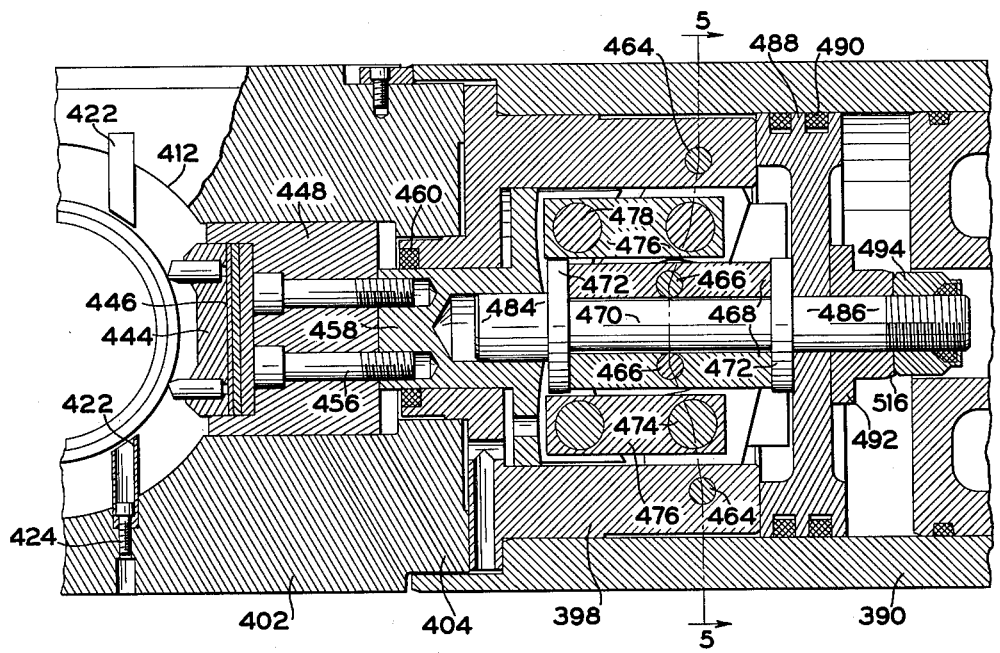
FIGURE 7 is a longitudinal section similar to FIG. 6 but taken along line 7—7 of FIG. 5.

The chuck also comprises three rests to receive and support the work piece temporarily before the chuck is closed. Two of these rests 422 are stationary and are fixed in suitable recesses in the wall of opening 412 by screws 424 (FIG. 7). The third rest 428 (FIGS. 3 and 4) is resiliently mounted so that the work piece is received in the chuck with its axis displaced from the transverse axis of the chuck and thus may be passed into the chuck without touching the stationary gripping jaws 416. The rest 428 is disposed in a recess 430 in the wall of opening 412. A pair of detents 432 are mounted in the chuck body 402 to abut the outward edge of rest 428 and contain compression springs 434 to urge the rest 428 toward the center of the chuck. The springs 434 are retained in the detents 432 by a pair of plates 436 secured to the exterior of chuck body 402 by screws 438. One end of the inwardly facing surface of rest 428 is beveled as at 440 to permit an entering work piece to thrust the rest aside and compress springs 434. The movement of rest 428 toward the chuck center is limited by a screw 442 threadedly engaging the rest 428 and having its head seated in a counterbore in the chuck body 402.

A third chuck jaw 444 (FIGS. 3 and 7) is seated, together with shims 446, in a recess in a slide 448 and is held therein by screws 450. The slide 448 is disposed in the chuck body 402 on the end toward the drum 390 and is held for sliding movement therein, toward and away from the chuck center by gibs 452 and screws 454 (FIGS. 4 and 8). As best seen in FIG. 7, the slide 448 is secured by screws 456 to the forward end of a connecting member 458 disposed within the cylindrical member 398. The cylindrical member 398 has a reduced diameter forward end projecting into the chuck body 402 and provided with a seal 460 surrounding the forward end of connecting member 458.

The chuck opening and closing mechanism comprises two pairs of levers 462 (FIGS. 5 and 6), each pair being pivotally mounted on a pin 464 passed tangentially through the cylindrical member 398. Each pair of levers 462 extends beyond the axis of the drum 390 and, on the side of the axis opposite to that on which their respective pivot pins 464 are located, are pivotally attached by pins 466 to one of a pair of blocks 468. The blocks 468, as shown in FIGS. 5 and 7 are voided centrally to virtually surround a rod 470 and fit snugly between a pair of flanges 472 formed integrally with the rod. Thus any movement of the rod 470 axially of the drum 390 is communicated to the pivot centers 466. Each lever 462 also has a circular opening between its fulcrum 464 and the axis of drum 390 by means of which openings each pair of levers is pivotally attached by a pin 474 to one end of a link 476. The other ends of links 476 are pivotally attached by pins 478 to the connecting member 458.

Thus it will be seen that any axial movement of the rod 470 will cause the levers 462 to rock about their respective fulcrums 464 and will cause a lesser movement in the same direction axially of the drum 390 of the centers of pins 474. This motion is transmitted through links 476, pins 478, connecting member 458 and screws 456 to the grip slide 448. It will be noted that since the axial movement transmitted from rod 470 to the slide 448 is decreased the force transmitted is proportionately increased. The lever advantage or ratio of force is equal to the ratio of the lever arm 464—466 to the lever arm 464—474. In the instance shown in the drawings this ratio is 3:1. That is to say that if a force of, say, 3000 lbs. is applied to move the rod 470 to the left as seen in FIG. 7, a force of 9000 lbs. minus friction losses, will be applied to the slide 448 to close the movable grip 444 upon the work piece.

It will be noted that the cylindrical member 398 is slotted at 480 and 482 to provide space for the above-described levers 462. The connecting member 458 is also provided with a transverse slot for the same purpose and the links 476 and blocks 468 are disposed between the levers 462 within the member 458. The rod 470 has a cylindrical projection 484 at its forward end to center the rod in the interior of member 458 as shown in FIG. 7. The rod 470 also has a rearward extension 486 upon which is mounted a piston 488 with piston rings 490 to provide an airtight engagement between the piston 488 and the interior surface of the drum 390.

Rearwardly of piston 488 a flanged bushing 492 is mounted on extension 486 and it and the piston are retained thereon against the adjacent flange 472 by a lock nut 494 threaded on the extremity of the extension 486. As best seen in FIGS. 3 and 5, a plurality of compression springs 496 are seated in axially directed, rearwardly facing recesses in the connecting member 458 and engage the forward face of piston 488 to urge it rearwardly. It will be apparent, then, that the gripping jaw 444 is closed upon a work piece when sufficient fluid pressure is applied to the rear face of piston 488 and the jaw is opened when said fluid pressure is released to allow springs 496 to move the piston 488 rearwardly. In this operation the interior of drum 390, of course, is employed as the operating cylinder.

Referring to FIGS. 3 and 6, it will be seen that the forward wall 394 of sleeve 392 is provided with an integral, rearwardly extending boss 498 having a central opening 500 and a counterbore 502. An air supply tube 504 is supported in opening 500 and is held therein by a lock nut 506 disposed in the counterbore 502 and threadedly engaged on the tube. A channel 508 is formed in the wall 394 and boss 498 to connect counterbore 502 with the chamber at the rear face of piston 488. A ball check valve 510 is located in the channel 508 to permit air to move through that channel in the forward direction only. A branch channel 512, also connecting the air chamber with the counterbore 502, is provided with an adjustable metering valve 514. The forward end of the counterbore 502, with the piston 488 in its rearward position, is closed by the bushing 492. Thus, for air to enter the chamber initially to move piston 488 forward, it must pass through the channel 508 and check valve 510, whereby the full force of the air pressure is immediately applied to the rear face of piston 488. On the return stroke, the lock nut 494 projects part way into counterbore 502 at the start thereof and, as the piston 488 moves rearwardly, the bushing 492, provided with the bevel 516, enters the counterbore and gradually closes the same as an exit for the escaping air. The remaining air then exhausts through the metering valve 514 and channel 512, providing a cushion for the rearwardly moving piston 488. The rearward travel of the piston is limited by contact of a shoulder on bushing 492 with the forward wall 394 of sleeve 392.

A cylinder end member 518 (FIG. 3) is seated in a shallow counterbore in the rear end of sleeve 392 and is retained therein by a cam ring 520 secured to the end of sleeve 392 by screws 522. The air supply tube 504 extends into cylinder end member 518 where it is surrounded by packing 524. The packing is held in place by a plate 526 and screws 528, forming an airtight seal between tube 504 and end member 518. A passage 530 is provided in the member 518 through which air may be supplied to the tube 504 from a conventional source of air pressure (not shown).

The rear end of member 518 is provided with a tapped hole which is threadedly engaged by the forward end of a piston rod 523 of a pneumatic cylinder 534. The cylinder 534 is attached by means of its extended tie-rods 536 and nuts 538 to a rear cover plate 540. The cover plate 540 closes a large opening in the rear wall of bed 40 and is secured to the latter by screws 542. Thus the cylinder 534 is mounted stationarily with respect to bed 40 and, by virtue of its connection to cylinder end member 518, serves to move the drum 390 and all parts attached thereto and contained therein, reciprocally in the cylinder 388.

*Chuck Indexing Mechanism*

To provide the necessary rotative movement of drum 390, a gear 544 is mounted on the rear end of the drum and is secured by screws 546 to the forward surface of cam ring 520 (FIGS. 3, 9 and 10). The gear 544 meshes with an elongated, smaller gear 548 whose forward end is journalled in a bracket 550. As shown in FIG. 9, the bracket 550 is secured to the top surface of bed 40 by means of screws 552 and locating pins 554.

Two shelves 556 and 558 are formed integrally with bed 40 on opposite sides thereof and extend inwardly toward the center of the machine. A transverse bracket 560 is supported on shelves 556 and 558 and is held in place by screws 562. A pinion housing 564 (FIGS. 9, 10 and 11) is formed integrally with bracket 560 and is aligned axially with the long gear 548, whose integral shaft 566 is supported on a bearing 568 in the housing 564. A lock nut 570 is provided to retain the shaft 566 in correct axial position. A cap member 572 closes the end of housing 564 and is secured thereto by screws 574. A pinion 576 is disposed within the housing 564 and is journalled upon a bushing 578 which in turn is mounted on the shaft 566. The teeth of pinion 576 are operatively engaged by a transverse rack 580.

At its forward end, pinion 576 has integrally formed thereon a cylindrical portion 582 which extends forwardly out of housing 564 and is enclosed by a cap member 584. The cap member 584 is secured against axial movement on shaft 566 by a set screw 586 (FIG. 11), and is constrained to rotate with said shaft by key 588. The cap member 584 has extending to one side thereof a boss 590 (FIG. 12) containing a detent 592 directed radially of the shaft 566. A pin 594 is passed through one wall of boss 590 radially toward the detent 592, engaging a keyway 596 therein to prevent the detent from rotating. The opening containing detent 592 is closed at its outer end by a hollow screw 598 and a spring 600 is held in compression between screw 598 and the hollow detent to urge the latter radially toward the axis of shaft 566. The point of detent 592 is substantially square on one side but has a sharp bevel 602 on the other while the periphery of cylindrical portion 582 is provided with a notch 604 to fit closely the inner end of the detent. Accordingly it will be apparent that when the pinion 576 is rotated in the counterclockwise direction, as seen in FIG. 12, the detent 592 causes the cap member 584 to be rotated also thus causing the gear 548 to be rotated via key 588.

Within the housing 564 and between the pinion 576 and the bearing 568 a clutch member 606 (FIG. 13) is mounted on shaft 566, is caused to rotate as a unit therewith by means of a key 608, and is held against axial movement relative thereto by a set screw 610. The member 606 has a spiral periphery with a step 612 joining the maximum and minimum points thereof. The adjacent portion of housing 564 is provided with an opening 614 in which is disposed a hollow detent 616 directed radially toward the periphery of member 606 and urged in that direction by a compression spring 618. The spring 618 is held in place by a hollow screw 620 threadedly engaged in the end of opening 614. The detent 616 is prevented from rotating by a pin 622 fixed in the housing 564 and engaging a keyway 624 in the detent.

It will be evident that, when the shaft 566 is rotated counterclockwise, as seen in FIGS. 12 and 13, the clutch member 606 rotates freely. When the direction of rotation is reversed, the detent 616 makes contact with the step 612 and the shaft 566 is prevented from rotating. The described counterclockwise rotation of pinion 576 and shaft 566 is caused by a forward stroke of the rack 580. Upon the return stroke of the rack, when the shaft 566 is held by the detent 616, the bevel 602 on detent 592 causes the latter to be forced into the boss 590 and the cylindrical portion 582 can rotate in the clockwise direction. Therefore, in the reciprocation of rack 580, the shaft 566 is rotated intermittently in one direction only. A cap may be attached to the side of bed 40 to enclose the rack 580 when it protrudes therefrom in its reciprocal movement.

To effect reciprocation of rack 580, the rack is attached to the piston rod of a pneumatic cylinder 626 (FIGS. 9 and 10) which is secured on bracket 560 by screws 628 and which may protrude through an opening 630 in the side of bed 40. The rack 580 has sufficient length of toothed engagement with the pinion 576 to cause the gear 548 to rotate the gear 544, and with it the chuck drum 390, 90 degrees upon each stroke of the rack.

A means is provided to lock the chuck drum 390 in indexed position, comprising a lock bolt 632, whose longitudinal axis is disposed parallel to the axis of the drum. The lock bolt 632 is mounted in a rectangular slideway formed in a block 634 which is secured to bracket 560 by screws 636. A pair of gibs 638 is fastened to the top of block 634 by screws 640 to constrain the lock bolt 632 to move longitudinally only. Such motion is induced by a pneumatic cylinder 642 whose piston rod 644 is threadedly engaged in the rear end of lock bolt 632. The cylinder 642 is attached to bracket 560 by screws 646.

The forward end of lock bolt 632 is wedge shaped to engage a similarly formed recess in the cam ring 520. As seen in FIG. 14, the recess in cam ring 520 is lined on both sides by inserted hardened wear pieces 648 held in position in the cam ring by screws 650. Two such recesses are provided to lock the chuck drum 390 in either of two indexed positions, 180 degrees apart.

*Float Mechanism*

To accommodate variations in concentricity between individual work pieces, it is necessary to provide a floating means between the tap and the work piece. As set forth above, important advantages are achieved by floating the entire headstock of the machine. This is done by providing an intermediate plate 652 between the bed 40 and headstock 42 (FIGS. 1, 2, 3 and 32). A pair of cross-bars 654 are cast integrally with bed 40 at the top thereof and assist in supporting the intermediate plate 652 which, in plan view, is formed generally to coincide with the top surface of the bed (FIG. 32) having a similar pair of cross-bars 656.

As shown in FIG. 3, a pair of keys 658 are secured to the bottom of cross-bars 656 by screws 660 to engage keyways 662 formed in the top surfaces of bed cross-bars 654. The keys 658 provide for movement of the plate 652 relative to the bed 40 in a direction parallel to the axis of chuck drum 390. A second pair of keys 664 are secured in the top surface of plate 652 by screws 666 to engage mating keyways 668 (FIG. 22) in the bottom surface of the headstock 42. The keys 664 are located at both sides of the machine and provide for relative movement between plate and headstock in a direction perpendicular to the axis of the chuck drum 390. Thus the headstock 42 is free to move relative to the bed 40 in any direction.

Between the two crossbars 654, the bed 40 is provided with a pair of integral shelves 670 on opposite sides thereof. A bar 672 is secured on shelves 670 by screws 674 and locating pins 676. The bar 672 serves to support a vertically directed screw 678 (FIG. 34) which is threadedly engaged in the bar and may be secured against accidental rotation by a locknut 680. The upwardly directed point of screw 678 has a frusto-conical shape to engage a similarly formed opening in a bushing 682 which is seated in a suitable opening in the bottom of headstock 42. Thus, by adjusting the vertical position of screw 678, the total allowable movement between bed 40 and headstock may be set at any desired value.

The plate 652 and headstock 42 can move freely with respect to the bed 40 by virtue of the provision of four bearing assemblies (FIG. 33) which provide clearances between plate and headstock and between plate and bed. Each bearing assembly comprises a cap screw 684 disposed vertically in a tapped hole in the top of bed 40. A hardened washer 686 surrounds the screw 684 and is partially embedded in the top of bed 40 to serve as the lower race for a thrust bearing 688. Another hardened wear plate 690, mounted in the intermediate plate 652 serves as both the top race for bearing 688 and the bottom race for a second bearing 692 whose upper race 694 is partially inset into the bottom surface of headstock 42. Similarly, a third bearing assembly comprising the hardened washers 696 and 698 and the bearings 700 are mounted between the head of screw 684 and a surface of headstock 42. The head of screw 684 and bearing 700 are enclosed in a counterbore 702 in a foot 704 of the headstock by a welch plug 706. As shown in FIGURE 3 the diameter of the shank of the bolt 684 is less than the diameter of the openings in the plate 690 and in the headstock 42 through which it projects to permit the limited relative movement between parts necessary to establish the desired float.

The damping effect of the headstock mass may be augmented by the provision of special damping means, two types of which are shown in FIGS. 32, 35 and 36. In the type shown in FIG. 36, a substantially square recess 708 is formed in an edge of plate 652, enclosed laterally by a rectangular plate 710 secured to plate 652 by screws 712. Imprisoned in recess 708 between two fibre pieces 714 is a compression spring 716 which serves to press the fibre pieces against the vertically adjacent surfaces of headstock and bed.

The second type of damping means is adjustable in contrast to the type just described which relies on the fixed pressure of the spring to provide damping friction. As shown in FIGS. 32 and 35, the adjustable damper is also disposed in a substantially square recess 718 in plate 652, enclosed laterally by a plate 720 secured to plate 652 by screws 722. In this case, however, the plate 720 is perforated centrally to pass a stud 724 having on its inner end an integral block 726 which is wedge-shaped in vertical section. The block 726, when stud 724 is urged outwardly, exerts divergent pressure upon a pair of fibre wedges 728 which bear against the vertically adjacent surfaces of headstock and bed respectively. The stud 724 is urged axially outwardly by a compression spring 730 surrounding it and held in place by a washer 732 and a nut 734 threaded on the end of the stud. The nut 734 may be moved to increase or decrease the pressure of spring 730.

*Work Handling Mechanism*

The magazine 44, best shown in FIGS. 15 and 16, comprises two vertically arranged side members 736 and 738. The lefthand side member 736 is secured by screws 740 to a multi-purpose bracket 742 attached to the front of bed 40 by screws 744. The screws 740 may be provided with T-shaped nuts (not shown) for engagement with a T slot 746 in bracket 742 so that the vertical position of magazine side 736 may be adjusted. Additionally, the side member 736 may have an integral key 748 to engage the slot 746 to assist in supporting the side member. The two side members 736 and 738 are joined by a pair of rods 750 and set screws (not shown) may be provided to fix the side members releasably to rods 750 in order to adjustably alter their lateral spacing to accommodate various lengths of couplings.

Each side member has a boss 752 formed on its bottom edge to receive a jack screw 754 which is secured in said boss by a pin 756. The jack screw 754 is telescopically received in a tube 758 and its vertical position in the tube 758 is determined by a pair of nuts 760. Both of the tubes 758 are supported without fastening means on a horizontally disposed plate 762 which is secured by screws 764 upon a forward extension 766 of the bracket 742. It will be understood that the righthand side member 738 is supported only by tie rods 750 and one of the jack screws 754 and does not need to be screwed to the bracket 742.

A pair of angle irons 768 and 770 are secured to the inner side of each magazine side member 736 and 738 by means of screws 772 and washers 774 to form a vertical channel to hold the couplings W. The screws 772 pass through elongated slots 776 in the magazine side members 736 and 738 to permit the space between each pair of angle irons 768 and 770 to be altered adjustably to accommodate work pieces of various diameters. An inclined chute 778 is attached by screws 780 and washers 782 to each side member on the inner sides thereof and below the angle irons 768 and 770. The vertical travel of the work pieces is arrested by the work-receiving surfaces 784 of the inclined chute members, whence the work pieces are conducted rearwardly and downwardly between the side guides 786 of the inclined chute members 778 and the side guides 788 formed on the lower ends of the angle irons 770. The rearward position (FIG. 16) of the chute members 778 is also adjustable by reason of the slots 790 in the magazine side members 736 and 738, through which the screws 780 pass.

The work pieces roll one at a time out of the magazine on the surfaces 784 into position for lateral transfer by the loading mechanism 46 to the chuck. Specifically, the work piece W is deposited upon the upper edges of a pair of plates 792 releasably secured to the bracket 742 by clamps 794 and screws 796. A third plate 798 prevents the work piece from rolling beyond the plates 792 and is adjustably secured by washers 800 and screws 802 to a bracket 804 which in turn is attached to the bed 40 by screws 806. It will be understood that in this position, determined by the edges of plates 792 and 798, the work piece axis is in substantial alignment with that of the chuck 402 provided the latter is in its extreme forward or loading position and is rotated as shown in FIG. 15.

The carriage for transferring the work piece into the chuck comprises an upright bracket 808 having two arms 810 and 812 at the top thereof extending in opposite directions toward the magazine 44 and the bed 40 respectively. A plate 814 is secured to the arm 810 by screws 816 and serves to retain the work pieces in the magazine when the work piece deposited on the plates 792 is transferred laterally. A plate 818 is secured to the arm 812 by screws 820 and extends rearwardly into sliding contact with a wear strip 822 secured to the top of bracket 742 (FIG. 16). This contact serves to support the weight of the couplings in the magazine during the lateral transfer movement of the bracket 808. As shown in FIG. 20, the plates 814 and 818 extend a short distance to the left beyond the end of bracket 808 to engage the end of a work piece lying on the plates 792. To provide a three-point contact a hardened strip 824 is attached by screws 826 to the end of bracket 808 (see also FIG. 17).

The bracket 808 is secured by screws 828 (FIG. 19) to a base member 830 which in turn is attached to a slide 832 by screws 834. The slide 832 is mounted in a rectangular slideway 836 in the bracket 742 (FIG. 16) and is retained therein by gibs 838 secured to said bracket by screws 840. A lower slide 842 is also mounted in a slideway 844 in bracket 742, directly beneath the slide 832. The lower slide 842 has threadedly engaged in one end thereof the piston rod 846 of a pneumatic cylinder 848 (FIG. 15) which is secured upon bracket 742 by screws 850.

The lower slide 842 is provided with an upstanding lug 852 at each end, both of which have mutually aligned openings to receive a headed adjusting screw 854. The screw 854 is retained in position axially by means of a bracket 856 (FIG. 21) which spans the head of screw 854 and is attached to the adjacent lug 852 by means of screws 858. The bracket 856 thus serves as a thrust bearing to accept the axial load placed on the screw 854. A nut 860 is mounted on screw 854 between the lugs 852 and has one side engaged in a rectangular recess in the bottom of the upper slide 832. Thus, rotation of the screw 854 will cause the nut 860 to travel lengthwise thereof to adjust the position of the upper slide 832 relative to the lower slide 842. This is employed to set the slide 832 at the correct initial position to engage a work piece which is to be moved laterally by the cylinder 848.

The work stop mechanism 48 is mounted on the left side of bracket 742 as seen in FIG. 15, that is, on the side of the chuck opposite the loading mechanism 46 just described. The work stop mechanism 48 comprises a bracket 862 secured to bracket 742 by screws 864. The bracket 862 has a pair of bosses 866 formed integrally therewith and provided with aligned bores to receive a pivot shaft 868 (FIGS. 17 and 18). Upon this horizontally disposed shaft 868 and between the two bosses 866 is journalled a rockable bracket 870 provided with a large rectangular slot 872 in which is seated the work stop holder 874. The holder 874 is retained in slot 872 by a plate 876 which is secured to bracket 870 by screws 878, one on each side of the slot. The top surface of work stop holder 874 and the bottom surface of plate 876 are provided with interfitting serrations 880 by means of which the position of the holder 874 may be adjusted longitudinally of the slot 872. The upper end of holder 874 has a tapped hole therethrough to receive the threaded shank 882 of a work stop 884. The work stop is held in adjusted axial position by a locknut 886.

The bracket 862 further has a boss 888 having a vertically directed opening in which a pivot pin 890 (FIG. 19) is held by a set screw 892 (FIG. 15). On the upper portion of pin 890 is journalled a lever having two arms 894 and 896. The arm 896 has inserted in the end thereof a pin 898 which engages tangentially a vertically aligned pin 900 fixed in the rockable bracket 870. The lever arm 894 is bifurcated at its end to extend on opposite sides of a tube 902 mounted horizontally through openings in the two bosses 866 of bracket 862. A block 904 is mounted on tube 902, adjacent the lever arm 894, and has threadedly engaged therein a screw 906 which is supported in the tube 902. A nut 908 locks the screw 906 in adjusted axial position. A second screw 905 is threaded into one of the bosses 866 and has its head engaged in a counterbore 907 in the block 904 to limit travel of the screw 906 and block 904.

The rockable bracket 870 has a lug 910 (FIG. 18) extending angularly downward near a portion of the bracket 862. A detent 912 is mounted in this portion of bracket 862 and is backed by a compression spring 914. The detent 912 contacts the lug 910 to urge the brackets 870 to rotate about the shaft 868 in the clockwise direction as seen in FIG. 18. A portion 916 of the lug 910 makes contact with the bracket 862 to limit rotation of the bracket 870 in the counterclockwise direction.

A discharge chute is also provided for the finished work pieces and may comprise an angle iron 918 (FIG. 17) supported by a bracket 920. The bracket 920 has secured thereto by screws 922, guide strips 923 to engage a plate 924, T-shaped in cross-section, for vertical adjustment of the discharge chute according to the diameter of the work piece. The plate 924 is secured to the front of bed 40 by screws 926 (FIG. 15).

*Control Devices*

The primary control means for effecting the automatic operation of the machine consists of limit switches operated by the various moving parts. The location and actuation of such switches will now be described.

One of the leadscrew nut slides 370 (FIG. 30) has fixed therein a pin 928 which extends vertically upward through an enlarged opening 930 in the cover plate 372. A lever 932 having a slot 934 engaging the top end of pin 928 is mounted on the top of cover plate 372 for pivotal movement about a screw 936. A screw 938, locked in position by a nut 940 is threadedly engaged in the end of lever 932. The head of screw 938 is arranged to actuate the lever of a limit switch LS1 secured by screws 942 to a bracket 944 which in turn is attached by screws 946 to the bracket 362. Thus, when the leadscrew nuts 378 are disengaged from the leadscrew 312, the movement of pin 928 will rock the lever 932 to actuate the limit switch LS1.

As shown in FIGURE 31, a limit switch LS2 is secured to the bottom of plate 100 and has a right angle actuating lever 948 with a roller 950 for operation by a flanged ring 952 surrounding the spindle 90. A rod 954 (FIG. 24) is passed diametrically through a close fitting opening in the slide member portion 262 and through elongated slots 956 in sleeve 258 and spindle 90 to engage opposite sides of the ring 952. Snap rings 958 hold the rod 954 in position axially. Movement of the slide portion 262 upwardly relative to the spindle 90 will thus cause the ring 952 to move upwardly also and to actuate the switch LS2.

Limit switches LS3 and LS4 are attached to the interior of the headstock 42 by means of brackets 960 and 962 respectively, and screws 964. The switch LS3 is actuated by an actuating member 966 secured by screws 968 to the plate 100 (FIG. 31) while switch LS4 is operated by a similar member 970 secured to the same plate by screws 972. Limit switch LS5 is secured to the opposite wall of headstock 42 for actuation by a member 974 also attached as by screws 976 to the plate 100.

In the bed 40 of the machine (FIGS. 3 and 10) a bracket 978 is fastened to the side wall of the bed by screws 980 and carries a limit switch LS6 for actuation by a stud 982 screwed into the cylinder end member 518 and projecting rearwardly therefrom. A nut 984 locks the stud 982 against accidental rotation. The stud 982 operates the switch LS6 when the chuck drum 390 is withdrawn to the rear end of its stroke. A limit switch LS7 is attached by screws 986 (FIG. 9) to a bracket 988. Screws 990 secure the bracket 988 to the bed 40, disposing the switch LS7 to be actuated by the side face of the gear 544 when the chuck drum 390 is at its extreme forward position.

As shown in FIG. 10 another bracket 992 is attached to the side of the bed 40 and carries a limit switch LS8 in position to be actuated by a cam 994 attached by a screw 996 to the rear face of gear 544. A bracket 998 is secured by screws 1000 to the opposite wall of bed 40 and has attached thereto by screws 1002 a limit switch LS9. This switch is disposed to be actuated by a cam 1004 fastened by screws 1006 to the cam ring 520. A further bracket 1008 is secured by screws 1010 to the bed 40 and supports a limit switch LS10 in position to be actuated by a cam 1014 also attached to cam ring 520 by screws 1016. The switches LS8, LS9 and LS10 are operated by the rotative movement of the drum 390 in a manner to be described in detail later.

Two limit switches LS11 and LS12 are mounted on a bracket 1018 attached by screws 1020 to the top of the clutch housing 564 (FIGS. 9 and 10). The rack 580 has secured as by set screws 1021 (FIG. 3) thereon a pair of flanged collars 1022 and 1024. The collar 1022 mounted near the outer end of the rack 580 is adapted to actuate the limit switch LS11 when the rack is retracted, as shown in FIG. 9. The collar 1024 mounted at the other end of rack 580 near the cylinder 626 will actuate the switch LS12 when the rack is in extended position.

A plate 1026 (FIG. 9) is fastened to one of the lock bolt gibs 638 by screws 1028 and a limit switch LS13 is secured to the plate 1026 by screws 1030. The operating lever of switch LS13 extends over the lock bolt 632 for engagement alternatively, in the reciprocation of the lock bolt, by a pair of screws 1032 mounted in a U-shaped bracket 1034 (FIG. 3) and secured in adjusted position therein by nuts 1036. The bracket 1034 is attached to the top of lock bolt 632 by screws 1038 and reciprocates with it.

As shown in FIG. 15, the bracket 742 has an elongated slot 1040 formed in its side outwardly adjacent the lower slide 832. A block 1042 (FIGS. 15 and 16) is partially inserted into the slot 1040 and attached to the side of slide 832 by screws 1044 (FIG. 20). The protruding portion of block 1042 has two screws 1046 and 1048 threadedly engaged therein with their axes aligned with the path of travel of slide 832. Both screws are locked in adjusted position by nuts 1050. The screw 1046 has the function of stopping the leftward travel of slide 832 by striking a suitable abutment on bracket 742 and since the position of the screw 1046 is adjustable, the length of stroke of the slide is consequently adjustable. The screw 1048 is disposed so as to operate a limit switch LS14 secured to a plate 1052 which in turn is attached to the bracket 742 by screws 1054.

*Operation*

The completely automatic operation of the machine is effected by an electrical control system in conjunction with a pneumatic system which provides the power for moving the various parts. These are shown diagrammatically in FIGS. 37 and 36 respectively. Power is supplied from the 3-phase alternating current lines L1. The primary coil of a transformer T1 is connected across two of the lines L1 to reduce the line voltage to a convenient control voltage for use with relays. The control lines leading from the secondary coil of the transformer T1 are designated L2 and L3. In line L2 are connected a fuse 1056 and a pressure switch PS1. The latter is also installed in the main air pressure line 1058 so that the contacts of switch PS1 are closed whenever working pressure is available in line 1058. Compressed air is supplied to the system from line 1058 which passes through a solenoid-operated cut-off valve 1060. The solenoid Q of the valve 1060 is connected across the lines L2 and L3 and thus is energized to open the valve whenever power is supplied to lines L1. A metering valve 1062 is installed in a branch line by-passing the valve 1060 for the purpose of allowing the pressure in the system to build up gradually to the value required to operate switch PS1 to energize solenoid Q and thus open line 1058 fully. It has been found that a sudden surge of air under pressure into the system sometimes changes the position of the valves, confusing the sequence of operation. Now with the switch PS1 closed and solenoid Q energized, control voltage exists between lines L2 and L3 and the push button switch PB2 may be pressed to close the circuit L3, CR1, PB2, PB1, L2 thus energizing the relay CR1 and closing CR1–1 and CR1–2, the two pairs of contacts associated with relay CR1. The contacts CR1–1 are connected to by-pass the start button PB2 and to close the holding circuit L3, CR1, CR1–1, PB1, L2 to maintain the relay CR1 in energized condition when the switch PB2 is released. The contacts CR1–2 are installed between control line L2 and its continuation L4 so that current cannot pass into any other elements of the system unless relay CR1 is closed. From this point forward, control voltage exists between lines L3 and L4.

The system may include a normally closed limit switch LS15 which is a safety switch to be opened upon accidental overtravel of the spindle 90 in the downward direction. Switch LS15 is not shown elsewhere in the drawings but may be mounted in the headstock 42 for operation by a member conveniently attached to one of the weight rods 138, for example, so that when the spindle moves too far down said member will have moved upwardly far enough to open LS15, which, as will be seen presently, will have the effect of stopping the spindle rotation. The limit switch is connected in series with stop and start push button switches PB3 and PB4, motor relay MR, and a pair of overload circuit breaking contacts 1064, the thermal elements of which are installed in two of the power lines L1.

Next in the operation of the machine the switch PB4 is pressed to close the circuit L3, MR, 1064, PB4, PB3, LS15, L4, energizing the relay MR and closing the four pairs of normally open contacts associated therewith. The contacts MR–1 bridge the push button switch PB4 and, when closed, close the circuit L3, MR, 1064, MR–1, PB3, LS15, L4, constituting a holding circuit for relay MR when switch PB4 is released. The remaining contacts MR–2, MR–3 and MR–4 are installed in the power lines L1 and, when closed, set the motor 56 in operation, thus rotating the spindle 90 as explained above.

The cycle start button PB6 is now pressed, closing the circuit L3, CR2, PB6, stop button PB5, L4 to energize the control relay CR2 and close the two pairs of contacts CR2–1 and CR2–2 associated therewith. Contacts CR2–1 bridge the switch PB6 and close a holding circuit for relay CR2.

Lines L3 and L4 terminate in the primary winding of a transformer T2 which is employed to reduce the control voltage to a convenient value for operating the solenoid-operated valves in the remainder of the system. In the example shown, approximately 8 volts is employed. If the solenoids used operate at 110 volts, the transformer T2 can be eliminated but return lines must be provided for the electrical system instead of grounding the lines as shown. Beyond the secondary coil of the transformer T2 the main control line is designated L5.

A branch of the air supply line 1058 leads through a pressure regulating valve 1066, line 1068 and a solenoid-operated four-way valve 1070 to the line 1078, the tube 504 and the air chamber in the drum 390. A pressure switch PS2 is connected in line 1078 between the valve 1070 and the tube 504 for actuation whenever air pressure exists at this point. Two sets of contacts PS2–1 and PS2–2 are associated with the pressure switch, contacts PS2–1 being closed when the switch is not under pressure and conversely for contacts PS2–2. At the start of the cycle no pressure exists at PS2, wherefore the contacts PS2–1 are closed and contacts PS2–2 are open.

Since the loading carriage 842 (FIG. 15) is in its starting position the limit switch LS14 is not actuated. In this position the contacts LS14–1 are closed and contacts LS14–2 are open. The chuck drum 390 is in the forward or loading position wherefore the gear 544 actuates limit switch LS7, closing contacts LS7–1 and opening contacts LS7–2. These conditions close the circuit L5, CR2–2, LS7–1, LS14–1, PS2–1, solenoid A, ground, energizing the solenoid A.

Solenoids A and B are associated with a four-way valve 1072 which is also connected to the air supply line 1058. When solenoid A is energized the valve 1072 is operated to pass air through line 1074 to the loading carriage operating cylinder 848 (FIG. 15). When solenoid B is energized the cylinder 848 exhausts through line 1076. Energization of solenoid A therefore causes the piston rod 846 to pull the slide 842 toward the left as seen in FIGS. 15 and 19. In this movement the strip 824 and the plates 814 and 818 make contact with the work piece W lying on the edges of plates 792 (FIG. 16) and carry the work piece into the chuck. The work piece first strikes the bevel 440 of rest 428, pressing the rest aside, and then passes through the chuck, which is disposed in the position shown in FIG. 15, supported on rests 422 and 428 and out of contact with the teeth of the grips.

The advancing slide 832 makes contact with the end of the screw 906. The movement of the slide is thus transmitted to the block 904 and the bifurcated lever arm 894, rocking the lever in the counterclockwise direction as seen in FIG. 19. Consequently the pin 898 secured in the lever arm 896 engages the pin 900 in the rockable bracket 870 causing the latter to rock about the shaft 868 in the counterclockwise direction as seen in FIGS. 17 and 18. This motion continues until the lug portion 916 strikes the bracket 862, the lug 910 meanwhile compressing the spring 914. The rocking movement of the bracket 870 carries the work stop 884 into the path of axial movement of the work piece W as shown in FIG. 17, thus stopping the work piece at the proper location, usually with equal lengths extending from opposite sides of the chuck as in FIG. 15.

The lateral movement of slide 842 is arrested by causing the adjustable stop screw 1046 to strike a convenient abutment on the bracket 742. Just before this occurs the screw 1048 is adjusted to actuate the limit switch LS14, opening contacts LS14–1 and closing contacts LS14–2. Consequently the above mentioned circuit through solenoid A is opened and the solenoid is de-energized. Since the spindle 90 is in its upper position at the start of the cycle, the limit switch LS4 is actuated as explained above, closing contacts LS4–2 and opening contacts LS4–1. Thus closing of the contacts LS14–2 closes the circuit L5, LS4–2, LS14–2, solenoid C, ground, energizing solenoid C.

Solenoid C opens the valve 1070 to permit air under pressure to enter the line 1078, the tube 504 and the air chamber in chuck drum 390 through the check valve 510 as explained above. The piston 488 is consequently displaced to close the grips upon the work piece in the chuck. The valve 1066 is provided in the line 1068 leading to the chuck operating cylinder in order to be able to regulate the pressure applied to the work piece. As is well known in the art this pressure is increased if the cutting torque is increased and decreased if thin-walled tubing is being operated upon to avoid squeezing the work out of round.

The presence of air under pressure in line 1078 causes the pressure switch PS2 to open contacts PS2–1 and close contacts PS2–2. That is to say the switch PS2 is actuated only after the work piece has been gripped. This closes the circuit L5, LS4–2, LS14–2, PS2–2, solenoid B, ground, energizing solenoid B. The solenoid B operates the valve 1072 to permit air pressure to enter the cylinder 848 through the line 1076 and to permit the rod end of the cylinder to exhaust through line 1074. As a result the loading slide 842 and associated parts are withdrawn to the position shown in FIGS. 15 and 20 and the succeeding work piece is received on the plates 792 as soon as the holding plate 814 (FIG. 16) has passed the chute 778.

The return of the loading carriage releases the limit switch LS14, closing contacts LS14–1 and opening contacts LS14–2. Opening of contacts LS14–2 opens the circuits through solenoids B and C and de-energizes both solenoids. Simultaneously with the energization of solenoid B another circuit is closed as follows: L5, LS4–2, LS14–2, PS2–2, solenoid E, ground, energizing solenoid E. Solenoid E operates the valve 1080, also connected to supply line 1058, to permit air under pressure to pass through line 1082 into the piston end of cylinder 534, causing the drum 390, the chuck 402, etc. to retract and to dispose the work piece beneath the tap 54.

The rearward movement of the drum 390 carries the gear 544 away from limit switch LS7, opening the contacts LS7–1 and closing contacts LS7–2. At the end of the rearward travel of drum 390, the stud 982 (FIG. 3) actuates limit switch LS6, closing the contacts LS6–1. At the start of the cycle the tap 54 is reset from the preceding operation with the chasers expanded to begin cutting. Consequently, the slide 218 and the ring 952 are in their lower positions relative to the spindle 90 and the ring 952 is spaced from the limit switch LS2, closing the contacts LS2–1 and opening contacts LS2–2. Also initially, the lock bolt 632 is disengaged from its seat between the wear parts 648 and the limit switch LS13 is engaged by the forward screw 1032 (FIG. 9) to close contacts LS13–1 and open contacts LS13–2. Further, since the rack 580 is retracted the collar 1022 actuates the limit switch LS11, closing contacts LS11–1 and opening contacts LS11–2. Therefore the return of the drum 390 to the rear position closes the circuit L5, LS4–2, LS7–2, LS6-1, LS2-1, LS13-1, LS11-1, solenoid G, ground, energizing solenoid G.

The solenoid G operates the valve 1084, which is connected to the air supply line 1058, to permit air under pressure to pass through line 1086 and enter the head end of the cylinder 626. This causes the rack 580 to be extended, rotating the pinion 576 and, as explained above, the gear 548, causing the gear 544, drum 390 and chuck 402 to rotate 90 degrees so that the flat faces of the chuck are horizontal and the work piece axis is aligned with that of the spindle 90.

The extension of rack 580 causes the collar 1022 to release the limit switch LS11, opening contacts LS11-1 and closing contacts LS11-2. At the end of the stroke of the rack, the collar 1024 actuates limit switch LS12, closing contacts LS12-1 and LS12-2. The opening of contacts LS11-1 opens the above circuit through solenoid G, de-energizing the solenoid. This combination of contacts closes the circuit L5, LS4-2, LS7-2, LS6-1, LS2-1, LS13-1, LS12-1, solenoid H, ground, energizing solenoid H. The solenoid H operates the valve 1084 in the reverse direction, thereby opening the line 1086 to exhaust and supplying air under pressure to the rod end of cylinder 626 through line 1088 to retract the rack 580. As explained above, this retraction of the rack is effected without rotating the gears.

As the chuck arrives at its present rotative position, hereinafter called the No. 1 tapping position, one of the cams 994 secured to the gear 544 actuates the limit switch LS8 (FIG. 10), closing contacts LS8-1. The limit switch LS10 is actuated by the cam 1014 only when the chuck is in loading position, the position shown in FIG. 10, wherefore at the present position the limit switch LS10 is not operated and contacts LS10-1 are closed and contacts LS10-2 are open. Similarly, the limit switch LS9 is engaged by the cam 1004 only when the chuck is in roll-over position, that is, 180 degrees from loading position and since the chuck is now only 90 degrees beyond loading position, the switch LS9 is not actuated. Contacts LS9-1 are closed and contacts LS9-2 are open. The manually operated selector switch SW1 has been closed at the start of the cycle.

The extension of rack 580 therefore closes the additional circuit: L5, LS4-2, LS7-2, LS6-1, LS2-1, LS8-1, LS12-2, LS10-1, LS9-1, solenoid J, ground, energizing solenoid J. This solenoid, when energized, operates valve 1090, which is connected to the air supply line 1058, to permit air to pass through line 1092 into the head end of cylinder 642. The piston rod 644 accordingly advances the lock bolt 632 into engagement with its seat in cam ring 520 (FIG. 14) and the drum 390 and chuck 402 are locked against further rotation. The simultaneous retraction of the rack 580, described above, releases the limit switch LS12 and actuates the limit switch LS11, closing contacts LS11-1 and opening contacts LS11-2, LS12-1 and LS12-2. This opens the circuits through solenoids H and J and de-energizes both solenoids.

The movement of the lock bolt 632, removes the forward screw 1032 (FIG. 9) from contact with limit switch LS13 and causes the rear screw 1032 to engage the switch thus opening contacts LS13-1 and closing contacts LS13-2. This closes circuit: LS5, LS4-2, LS7-2, LS6-1, LS2-1, LS8-1, LS13-2, solenoid L, ground, energizing solenoid L. The solenoid L operates the valve 1094 connected to line 1058 to admit air to the line 1096 whence it passes through the air operated valve 1098 into the line 1100. It will be understood that the valve 1098 will have been left in the proper position for such passage by the previous cycle. From the line 1100 the air under pressure passes into the head end of the cylinder 150. A metering valve 1102 is installed in line 1100 but permits free flow toward the cylinder 150 and performs its metering function on air moving in the opposite direction.

As stated above, the spindle 90 is counterbalanced by the weights 142 (FIG. 22), the weights being somewhat heavier than the spindle and its associated parts. The piston rod 152, under the influence of air entering the head end of cylinder 150 lifts the bar 136 to which the weights 142 are attached, permitting the spindle 90 to move rapidly downwardly. In the upward travel of the bar 136, the bracket 158 mounted thereon strikes the nut 172 forcing the rod 162 upwardly. The rod 162 is connected to the piston of the well-known hydraulic check device 164 which considerably reduces the upward speed of the weights and the downward speed of the spindle. Adjustment of the vertical position of nut 172 can cause this reduction in speed to occur when the tap 54 is just about to enter the work piece.

As the spindle 90 starts downwardly, the member 970 is removed from contact with the limit switch LS4, opening contacts LS4-2 and closing contacts LS4-1. Opening of contacts LS4-2 de-energizes solenoid L. When the downward travel of the spindle disposes the tap 54 in the position in which tapping is about to begin, the member 974 actuates the limit switch LS5, closing its contacts LS5-1 and closing the circuit L5, LS4-1, LS5-1, solenoid N, ground, to energize solenoid N. Energization of solenoid N operates the valve 1104 to admit air under pressure into the line 1106 whence it passes through the regulating valve 1108 and the check valve 1110 into the head ends of both cylinders 384 to force the leadscrew nuts 378 into operative engagement with the leadscrew 312. Since a high pressure is not required in this operation and indeed may damage the leadscrew or nuts, the regulating valve 1108 is provided to reduce the line pressure. The check valve 1110 prevents air from exhausting through the valve 1108 and forces it to discharge freely through the check valve 1112 installed in the branch line 1114, so that the exhaust is unimpeded and instantaneous. Pressure in line 1106 shifts the valve 1098 to open the line 1100 to exhaust. Thus there will be no effective pressure in either end of cylinder 150 while the leadscrew nuts are closed. The member 974 rides over the lever of limit switch LS5 and that switch immediately returns to its original condition with contacts LS5-1 open, thus de-energizing the solenoid N.

With the leadscrew nuts 378 closed on the leadscrew 312, the tapping operation proceeds. The chasers 190 engage the interior of the work piece as the spindle descends, while the ring 360 engages the end of the work piece and is held back thereby, causing an upward movement of the attached parts relative to the spindle. This relative movement is transmitted through the support member 350, ring 348, rods 342, ring 338 and studs 336 to the collar 238. Therefore as the slide member 216 moves downwardly with the spindle 90, the collar 238 is held against vertical movement. As a consequence, the lever 222 is rocked about the relatively stationary center of the pivot 244 in the collar 238. It will be apparent that the pivotal connection between the lever 222 and the upper slide member 218 causes the latter to move downwardly also but at a faster rate than that of the lower slide member 216. But since the upper slide 218 is constrained to move with the spindle 90 because of the engagement between latch 266 and bushing 264, the resultant effect is that of causing the slide 216 to move downwardly more slowly than the spindle 90. In effect, therefore, the slide 216 moves upwardly relative to the spindle and parts attached thereto. This relative movement is communicated through the tube 214, connector 204, adjusting member 202 and rod 200 to the plunger 196. This retardation of the plunger 196 causes the chasers 190 to be gradually withdrawn or receded radially as the tapping operation proceeds, with the result that a tapered thread is cut.

The downward movement of the spindle 90 relative to the collar 238 eventually brings the pin 272 (FIG. 28) into contact with the roller 308 whereby it is forced radially inwardly to compress the spring 268 and to depress the latch 266 out of contact with the bushing 264. Thereupon the spring 290 expands, lifting the retainer 292 and with it the slide member 218. This movement is transmitted as described above to the plunger 196, thus withdrawing the chasers 190 from contact with the work and collapsing the tap. Simultaneously, the rapid upward movement of the upper slide member 218 causes the flanged ring 952 to engage the limit switch LS2, open contacts LS2–1 and close contacts LS2–2. The above described closing of the leadscrew nuts has caused the pin 928 to rock the lever 932 to release the limit switch LS1, opening contacts LS1–2 and closing contacts LS1–1.

Accordingly, the circuit L5, LS4–1, LS2–2, LS1–1, solenoid P, ground, is closed, energizing solenoid P. The energization of solenoid P reverses the position of the valve 1104 admitting air under pressure into the line 1116 and thence into the rod ends of cylinders 384 to disengage the leadscrew nuts. The head ends of the cylinders 384 exhaust through line 1114 and valves 1112 and 1104.

The opening of the leadscrew nuts 378 causes the pin 928 to rock the lever 932 to actuate the limit switch LS1, opening contacts LS1–1 and closing contacts LS1–2. The opening of contacts LS1–1 opens the circuit through the solenoid P, de-energizing that solenoid. The closing of contacts LS1–2 closes a circuit L5, LS4–1, LS2–2, LS1–2, solenoid M, ground, energizing solenoid M. The energization of solenoid M shifts the valve 1094 permitting air under pressure to enter the line 1118 and to pass through it into the rod end of cylinder 150 to force the piston thereof downwardly and elevate the spindle 90. At the same time, pressure in the line 1118 shifts the air operated valve 1098 to open the line 1100—1096, permitting the head end of cylinder 150 to exhaust through valve 1094.

As the spindle 90 nears the upper limit of its travel, the cam 966 actuates the limit switch LS3, closing the contacts LS3–1. This closes a circuit L5, LS4–1, LS2–2, LS1–2, LS3–1, solenoid K, ground, energizing solenoid K. The energization of solenoid K shifts the valve 1090, connecting the supply line 1058 to the line 1122 and the rod end of the cylinder 642, thus withdrawing the lock bolt 632 to allow the drum 390 to rotate. At the same time the line 1092 is connected to exhaust.

The structure of the member 974 is such that the limit switch LS5 is not actuated on the upward travel of the spindle 90. The spindle parts continue upwardly, carrying the collar 238 into contact with the upper portion of the sleeve 76. A ring 1120, of fibre or similar material (FIG. 21) may be provided between collar 238 and sleeve 76 to minimize the shock of contact between those parts at this point in the operation. In the continued upward movement of spindle 90, the collar 238 is held back, causing the taper-producing mechanism to return to its starting position and compressing the spring 290 until the latch 266 re-engages the latch bushing 264, whereupon the parts, including tap 54, are again in condition to begin a thread-cutting operation. In this tap resetting process, the ring 952 is again withdrawn from contact with limit switch LS2, closing contacts LS2–1 and opening contacts LS2–2, thus de-energizing solenoids K and M.

The withdrawal of lock bolt 632 removes the rearward screw 1032 from contact with the limit switch LS13 and causes the switch to be actuated by the forward screw 1032, thus opening contacts LS13–2 and closing contacts LS13–1. The spindle 90, at the upper limit of its travel, brings the member 970 again into engagement with the limit switch LS4, opening contacts LS4–1 and closing contacts LS4–2. It will be seen that the proper contacts are now closed to re-establish the above described circuit through solenoid G, which as explained above, causes the drum 390 to be rotated 90 degrees. The chuck is thus brought into "roll-over" position, 180 degrees from loading position. In this position the limit switch LS9 (FIG. 10) is actuated by cam 1004 to open contacts LS9–1 and close LS9–2. Since the contacts LS9–1 are essential to the circuit for energizing solenoid J which causes the lock bolt to lock the drum 390, the drum is consequently not locked in this position. Instead the circuit through solenoid G is again re-established and a second successive 90 degree rotation of drum 390 results, leaving the chuck with its flat sides horizontal and 270 degrees in advance of its loading position. It will be seen that the chuck has been rotated 180 degrees from the No. 1 tapping position to present the opposite end of the work piece to the tap 54. This position will hereinafter be referred to as No. 2 tapping position. In this position the cam 1004 has left limit switch LS9, closing contacts LS9–1 and opening contacts LS9–2. At the same time limit switch LS8 is actuated by the second cam 994, closing contacts LS8–1. Consequently the above described energization of solenoid J is repeated to lock drum 390 and to cause the machine to go through a second tapping operation and a subsequent 90 degree indexing stroke.

This last 90 degree rotation of drum 390 disposes the chuck rotatively in loading position. Accordingly, limit switch LS8 is not actuated, contacts LS8–1 are open, and solenoid J will not be actuated to advance the lock bolt. Instead, limit switch LS10 is actuated by cam 1014 to open contacts LS10–1 and close contacts LS10–2. Since the spindle is up, contacts LS4–2 are closed. Since the drum 390 is to the rear, contacts LS7–2 and LS6–1 are closed. Since the tap is reset, contacts LS2–1 are closed. Since the lock bolt is withdrawn, contacts LS13–1 are closed. Since the rack 580 is retracted, contacts LS12–1 are closed. Under these conditions, a circuit is established as follows: L5, LS4–2, LS7–2, LS6–1, LS2–1, LS13–1, LS12–1, LS10–2, solenoid F, ground, energizing solenoid F.

The energization of solenoid F shifts the valve 1080 to admit air under pressure through line 1124 into the head end of cylinder 534 and to connect line 1082 to exhaust. The air in cylinder 534 moves the drum 390 and chuck 402 forwardly to the loading position described at the start of the cycle. Simultaneously with the energization of solenoid F a second circuit is closed as follows: L5, LS4–2, LS7–2, LS6–1, LS2–1, LS13–1, LS12–1, LS10–2, solenoid D, ground, energizing solenoid D. The energization of solenoid D shifts the valve 1070 to permit air to exhaust through line 1078 from the chamber in drum 390 as the springs 496 expand to retract the grip 448, leaving the work piece held only by the spring pressed rest member 428. As the drum 390 begins to move forwardly the stud 982 releases limit switch LS6, opening contacts LS6–1 and de-energizing solenoids D and F.

At the forward loading position the gear 544 again actuates limit switch LS7 to energize solenoid A as described above to operate the loading mechanism and thus repeat the cycle. It will be evident that the second work piece, upon entering the chuck will push the finished work piece onto the discharge chute 918.

If it is desired to perform only one threading operation before discharging the work piece, the selector switch SW1 is manually closed, thus effecting energization of solenoids D and F after the chuck has rotated 180 degrees instead of 360 degrees. Thus, with the drum 390 in the "roll-over" position described above, and before the rack 580 retracts to actuate limit switch LS11 to energize solenoid G, the closure of contacts LS9–2 by the arrival of the drum 390 in the "roll-over" position, 180 degrees from the loading position, closes the circuit L5, LS4–2, LS7–2, LS6–1, LS2–1, LS13–1, LS12–1, LS9–2, SW1 solenoid D (and F), ground. Thus the opening of the chuck and advance of the drum are effected before a circuit is closed to continue rotation of drum 390 and the chuck comes forward to loading position after one tapping operation and 180 degrees of rotation. This modified cycle also repeats until interrupted by manual intervention.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a machine for tapping pipe couplings and like work pieces, a machine base, a headstock, a spindle mounted on said headstock for rotation and for generally vertical reciprocating movement, a chuck for selectively gripping and releasing a work piece, means mounting said chuck in said base for reciprocation along a substantially horizontal axis and for rotary indexing movement about said substantially horizontal axis, means for moving said chuck horizontally between positions in alignment with the axis of said spindle and in alignment with a loading station, means for indexing said chuck to dispose the axis thereof in a substantially horizontal plane when said chuck is at said loading station, means operable to move a work piece horizontally into said chuck in a direction substantially normal to its said axis of reciprocation at said loading station, and a work stop mounted on said base in the path of the end of said work piece projecting through said chuck.

2. The combination according to claim 1 wherein said stop is mounted for bodily movement toward and away from its operating position to permit the subsequent ejection of a tapped work piece from said chuck.

3. In a tapping machine, a machine frame, a rotatable tool carrying spindle mounted in said frame for generally vertical reciprocation toward and away from a working station, a magazine in said frame, a substantially horizontal chute leading from said magazine to a loading station, a work holding chuck, means mounting said chuck in said frame for bodily movement between said working station and said loading station along an axis substantially normal to said chute and for indexing movement about said horizontal axis to selectively dispose the axis of said chuck in a substantially horizontal work-receiving position and a substantially vertical position for tapping, and means for moving a work piece along said chute and into said work holding chuck when said chuck is at said loading station.

4. The tapping machine according to claim 3 together with a work stop mounted on said machine frame in the path of the end of said work piece projecting through said chuck.

5. In a tapping machine, a machine frame, a rotatable tool carrying spindle mounted in said frame for reciprocation toward and away from a working station, a work holding chuck, means mounting said chuck in said frame for reciprocation between said working station and a loading station and for indexing movement about its axis of reciprocation, and automatically controlled power apparatus for sequentially advancing said chuck to said loading station, indexing said chuck to dispose its axis in a position to receive a work blank, moving said chuck to said working station and indexing said chuck to dispose the axis thereof in a position for tapping, reciprocating said tap toward said working station to thread said work piece, retracting said tap, and subsequently advancing said chuck from said working station to said loading station to permit the removal of a tapped work piece.

6. In a tapping machine, a machine frame, a rotatable tool spindle adapted to carry a tap, said spindle being mounted on said frame for reciprocation toward and away from a working station, a work holding chuck, means mounting said chuck in said frame for bodily movement between said working station and a loading station and for rotary indexing movement, power operated means for moving said spindle to position said tap at said working station to tap a work piece held thereat by said chuck and for subsequently withdrawing said spindle from said working station, automatic control means operable when said spindle is withdrawn to selectively index said chuck through 180° to permit subsequent tapping of the opposite end of said work piece or to move said chuck away from said working station to permit the removal of the tapped work piece, and manually operable control means to select the function of said automatic control means.

7. In a tapping machine having upper and lower machine frame sections, a work holding chuck mounted in the lower frame section and a spindle adapted to carry a tap mounted in the upper frame section for rotating movement and for reciprocating movement toward and away from said chuck, means mounting said upper frame section on said lower frame section for limited floating movement comprising a plate-like member interposed between said upper and lower frame sections, a plurality of bearing means interposed between said plate-like member and said upper frame section, a plurality of bearing means interposed between said plate-like member and said lower frame section, each of said bearing means permitting limited relative universal movement of the parts engaged thereby, cooperating key and key-way constructions on said plate and said lower frame section, permitting movement of said plate in only one direction with respect to said lower frame section, cooperating key and key-way constructions on said plate-like member and said upper frame section permitting movement of said upper frame section with respect to said plate-like member only in a direction normal to said first-mentioned direction, and means for adjustably limiting the movement of said upper frame section with respect to said lower frame section.

8. The combination according to claim 7 together with friction members carried by said plate-like member and engageable with said upper and lower frame sections to restrict the freedom of movement of said upper frame section with respect to said lower section.

9. In a machine for tapping pipe couplings and like workpieces, a machine base, a headstock, a spindle mounted on said headstock for rotation about a substantially vertical axis and for reciprocating movement along said axis, means mounting said headstock on said machine base for limited free floating movement thereon while preventing relative rotation of said headstock with respect to said machine base, a chuck for selectively gripping and releasing a work piece, means mounting said chuck in said base for bodily displacement along a substantially horizontal axis and for rotary indexing movement about said horizontal axis, means for moving said chuck along said axis between positions in alignment with the axis of said spindle and in alignment with a loading station, means for indexing said chuck to dispose the axis thereof in a horizontal plane when said chuck is at said loading station, and means operable to move a work piece horizontally into said chuck in a direction normal to said axis at said loading station.

10. In a machine for threading pipe couplings and like work pieces, a machine base, a headstock, a rotary spindle adapted to support a threading tool mounted on said headstock for reciprocating movement along its rotary axis, a chuck for selectively gripping and releasing a work piece, a drum, means mounting said chuck on said drum, means mounting said drum in said base for reciprocation along an axis substantially normal to the spindle axis and for rotary indexing movement about its axis, a gear mounted in surrounding relation with said drum adjacent one end thereof, a fluid operated rack reciprocable by fluid under pressure in a direction normal to the axis of said drum, a one-way drive connection between said rack and said gear whereby reciprocation of said rack indexes said drum and said chuck, fluid operated power means for reciprocating said drum along its axis to selectively dispose said chuck in alignment with a loading station and a working station beneath said spindle, and means operable to move a work piece into said chuck in a direction normal to the axis of said drum at said loading station.

11. In a machine according to claim 10 together with a work stop mounted on said base in the path of the end of said work piece projecting through said chuck, and means mounting said stop for bodily movement toward and away from its operating position to permit the subsequent ejection of a finished work piece from said chuck when a succeeding work piece is moved into said chuck.

12. Work handling mechanism for a threading machine having a base, a headstock, and a reciprocable tool supporting spindle mounted in said headstock comprising, a drum, means mounting said drum in said base for bodily displacement along an axis substantially normal to the spindle axis toward a working station to permit the threading of a workpiece carried thereby and away from a working station to permit insertion and removal of a workpiece and for rotary indexing movement about its axis, a chuck secured to one end of said drum, movable jaw members in said chuck, fluid operated means mounted in said drum and operatively connected to said jaw members to move said jaw members between operative and inoperative positions, means for actuating said fluid operated means and means for sequentially indexing and axially moving said drum in timed relation with the reciprocation of said spindle.

13. Work handling mechanism for a threading machine have a base, a headstock, and a reciprocable tool supporting spindle mounted in said headstock comprising, a drum, means mounting said drum in said base for bodily displacement along an axis substantially normal to the spindle axis and for rotary indexing movement about its axis, a chuck secured to one end of said drum, fluid actuated chuck operating means in said drum, fluid actuated means for bodily displacing said drum along its axis toward a working station to permit the threading of a workpiece carried thereby and away from a working station to permit the insertion and withdrawal of a workpiece therefrom, and a gear drive for rotating said drum, fluid actuated means for operating said gear drive, and control means for actuating said chuck operating means, said drum rotating means, and the means for axially moving said drum in timed relation with the reciprocation of said spindle.

14. In a threading machine, a rotatable tool carrying spindle reciprocable through an advance stroke toward a working station and through a retract stroke away from said working station, a work holding chuck, means mounting said work holding chuck for reciprocation toward and away from said working station and for indexing movement about its axis of reciprocation, means automatically operative when said chuck is in position at said working station for advancing said spindle to said working station to thread said work piece and thereafter retracting said spindle, and means responsive to a first retraction of said spindle for indexing said chuck 180° about its own axis to present the opposite end of said workpiece to said tool, means automatically operative upon completion of said indexing movement for again advancing said spindle to thread the opposite end of said work piece and thereafter retracting said spindle a second time, and means automatically operative when said spindle is retracted said second time to move said chuck away from said working station.

15. In a threading machine a rotatable spindle adapted to carry a threading tool mounted for reciprocation toward and away from a working station, and a work holding chuck, means mounting said chuck for reciprocation toward and away from said working station and for indexing movement about its axis of reciprocation, means operative automatically when said chuck is in position at said working station for advancing said spindle to thread said work piece and thereafter retracting said spindle, means operative in response to retraction of said spindle for indexing said chuck 90° about its axis, and means automatically operative upon the completion of said indexing movement for moving said chuck away from said working station.

16. A combination according to claim 15 together with means responsive to movement of said chuck to said working station to lock said chuck thereat, and means responsive to completion of the threading operation to unlock said chuck to permit the subsequent movement thereof.

17. In a threading machine, a rotatable spindle adapted to carry a threading tool mounted for reciprocation generally vertically to and away from a working station, a work holding chuck, means mounting said chuck for generally horizontal reciprocation between a loading station and said working station and for indexing movement about its axis of reciprocation, a substantially horizontal chute leading to said loading station, power operated loading device for advancing a work piece along said chute into said chuck, means responsive to the positioning of said work piece in said chuck for closing said chuck on said work piece, means operative upon the closing of said chuck to retract said loading device, means responsive to the retraction of the loading device for moving said chuck from said loading station means for indexing said chuck 90° about its axis to move the work piece to a position for threading, and means automatically operative when said work piece reaches said position for advancing said spindle to thread said work piece and thereafter retracting said spindle.

18. In a tapping machine having upper and lower machine frame sections, a work holding chuck mounted in the lower frame section and a spindle adapted to carry a tap mounted in the upper frame section for rotating movement and for reciprocating movement toward and away from said chuck, said upper and lower frame sections having body portions projecting forwardly at opposite sides of said spindle, means mounting said upper frame section on said lower frame section for limited floating movement comprising a plate-like member interposed between said upper and lower frame sections, a plurality of bearing means interposed between said plate-like member and said upper frame section, certain of said bearing means being positioned in said projecting body portions at opposite sides of said spindle, a plurality of additional bearing means interposed between said plate-like member and said lower frame section, certain of said additional bearing means being positioned in said projecting body portion at opposite sides of said spindle, each of said bearing means being arranged to permit relatively universal movements of the parts engaged thereby, cooperating key and keyway constructions on said plate-like member and said lower frame section permitting movement of said plate-like member in only one direction with respect to said lower frame section, cooperating key and keyway constructions on said plate-like member and said upper frame section permitting movement of said upper frame section with respect to said plate-like member only in a direction normal to said first-mentioned direction, and means for adjustably limiting the movement of said upper frame section with respect to said lower frame section.

19. Work handling mechanism for a threading machine having a base, a headstock and a reciprocable tool supporting spindle mounted in said headstock comprising; a drum, means mounting said drum in said base for bodily displacement along an axis substantially normal to the spindle axis toward a working station to permit the threading of a workpiece carried thereby and away from a working station to permit insertion and removal of a workpiece and for rotary indexing movement about its axis, a chuck secured to one end of said drum, movable jaw members in said chuck, operating means mounted in said drum and operatively connected to said jaw members to move said jaw members between work gripping and work relasing positions, means for actuating said operating means, and means for sequentially indexing and axially moving said drum in timed relation with reciprocation of said spindle.

References Cited in the file of this patent

UNITED STATES PATENTS

| | | |
|---|---|---|
| 508,864 | Briggs | Nov. 14, 1893 |
| 1,085,697 | Neckerman | Feb. 3, 1914 |
| 1,626,251 | Pennington | Apr. 26, 1927 |
| 2,206,031 | Drissner | July 2, 1940 |
| 2,235,269 | Walker | Mar. 18, 1941 |
| 2,660,738 | Hieber | Dec. 1, 1953 |
| 2,732,570 | Carpenter | Jan. 31, 1956 |
| 2,739,773 | Rougemont | Mar. 27, 1956 |